(12) United States Patent
Gao et al.

(10) Patent No.: US 9,668,220 B2
(45) Date of Patent: May 30, 2017

(54) METHOD AND APPARATUS FOR CONTROLLING UPLINK POWER

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/911,048

(22) PCT Filed: Aug. 8, 2014

(86) PCT No.: PCT/CN2014/083971
§ 371 (c)(1),
(2) Date: Feb. 9, 2016

(87) PCT Pub. No.: WO2015/018357
PCT Pub. Date: Feb. 12, 2015

(65) Prior Publication Data
US 2016/0183195 A1 Jun. 23, 2016

(30) Foreign Application Priority Data

Aug. 9, 2013 (CN) .......................... 2013 1 0347040

(51) Int. Cl.
*H04W 52/14* (2009.01)
*H04W 52/24* (2009.01)
(Continued)

(52) U.S. Cl.
CPC ....... *H04W 52/146* (2013.01); *H04L 25/0226* (2013.01); *H04W 52/242* (2013.01);
(Continued)

(58) Field of Classification Search
CPC . H04W 52/08; H04W 52/146; H04W 52/248; H04W 52/34; H04W 52/365; H04W 52/367; H04W 52/40
See application file for complete search history.

(56) References Cited

U.S. PATENT DOCUMENTS

| | | | | |
|---|---|---|---|---|
| 8,724,488 B2 * | 5/2014 | Shin | ...................... | H04W 52/32 370/252 |
| 9,439,217 B2 * | 9/2016 | Feuersaenger | ...... | H04W 74/004 |

(Continued)

FOREIGN PATENT DOCUMENTS

| | | |
|---|---|---|
| CN | 101252379 A | 8/2008 |
| CN | 101741437 A | 6/2010 |
| CN | 102045823 A | 5/2011 |
| CN | 102244923 A | 11/2011 |
| WO | 2013/025562 A2 | 2/2013 |

OTHER PUBLICATIONS

International Search Report of PCT/CN2014/083971 (and translation) dated Sep. 30, 2014, 5 pages.
(Continued)

*Primary Examiner* — Sujatha Sharma
(74) *Attorney, Agent, or Firm* — Kilpatrick Townsend & Stockton LLP

(57) ABSTRACT

Disclosed are a method and an apparatus for controlling uplink power, so as to solve a problem that in a scenario of double connections, when a terminal performs uplink transmission, there is no corresponding solution to control uplink power. The method in the present invention comprises: a terminal determining uplink information to be sent on an uplink carrier, the uplink information comprising uplink information corresponding to a first base station and uplink
(Continued)

information corresponding to a second base station; and the terminal determining, according to at least one group of power control parameters pre-configured for calculating transmit power of an uplink channel bearing the uplink information, transmit power of at least one uplink channel bearing the uplink information, and sending corresponding uplink information on the at least one uplink channel of the uplink carrier according to the transmit power of the at least one uplink channel. It is ensured that the terminal uses more appropriate transmit power on the uplink carrier to send uplink information of different base stations, thereby avoiding power limitation and improving power utilization and transmission efficiency.

10 Claims, 3 Drawing Sheets

(51) Int. Cl.
*H04W 52/34* (2009.01)
*H04L 25/02* (2006.01)
*H04W 72/04* (2009.01)
*H04W 52/40* (2009.01)

(52) U.S. Cl.
CPC ......... *H04W 52/346* (2013.01); *H04W 52/40* (2013.01); *H04W 72/042* (2013.01); *Y02B 60/50* (2013.01)

(56) References Cited

U.S. PATENT DOCUMENTS

| | | | |
|---|---|---|---|
| 2013/0010720 A1* | 1/2013 | Lohr | H04L 1/0026 370/329 |
| 2013/0058315 A1* | 3/2013 | Feuersanger | H04W 52/281 370/336 |
| 2013/0324182 A1* | 12/2013 | Deng | H04W 52/281 455/522 |
| 2014/0112260 A1* | 4/2014 | Sorrentino | H04W 72/0413 370/329 |
| 2014/0219152 A1* | 8/2014 | Anto | H04W 52/08 370/311 |
| 2015/0201388 A1* | 7/2015 | Cheng | H04W 52/14 370/329 |
| 2016/0212711 A1* | 7/2016 | Yi | H04W 52/146 |
| 2016/0255593 A1* | 9/2016 | Blankenship | H04W 52/146 |

OTHER PUBLICATIONS

"$3^{rd}$ Generation Partnership Project; Technical Specification Group Radio Access Network; Evolved Universal Terrestrial Radio Access (E-UTRA); Physical layer procedures (Release 11)", 3GPP Standard; 3GPP TS 36.213, $3^{rd}$ Generation Partnership Project (3GPP), Mobile Competence Centre; 650, Route des Lucioles; F-06921 Sophia-Antipolis Cedex; France, vol. RAN WG1, No. V11.3.0, Jun. 25, 2013, pp. 1-176, XP050692859, [retrieved on Jun. 25, 2013] * p. 12, line 3-line 12*.
Supplementary European Search Report for EP 14834964 mailed Jun. 20, 2016, 9 pages.

* cited by examiner

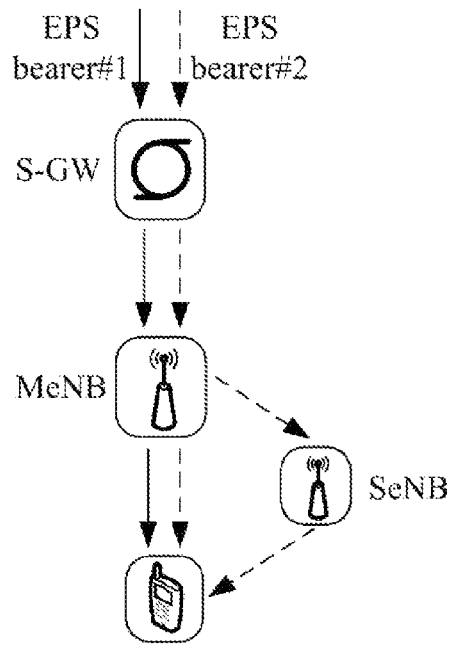

Fig.3

A UE determines uplink information to be transmitted over one uplink carrier, where the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier ⟿ 42

The UE determines transmit power of at least one uplink channel carrying the uplink information, according to at least one set of pre-configured power control parameters for calculating transmit power of an uplink channel carrying the uplink information, and transmits the corresponding uplink information in the at least one uplink channel over the one uplink carrier at the transmit power of the at least one uplink channel ⟿ 42

Fig.4

METHOD AND APPARATUS FOR CONTROLLING UPLINK POWER

This application is a US National Stage of International Application No. PCT/CN2014/083971, filed on 8 Aug. 2014, designating the United States, and claiming the benefit of Chinese Patent Application No. 201310347040.9, filed with the State Intellectual Property Office of People's Republic of China on Aug. 9, 2013 and entitled "Method and device for controlling uplink power", which is hereby incorporated by reference in its entirety.

FIELD

The present invention relates to the field of communications and particularly to a method and device for controlling uplink power.

BACKGROUND

Along with the technical evolvement and emerging data services, such a scenario may occur in later releases of the Long Term Evolution-Advance (LTE-A) system that a User Equipment (UE) is configured to operate while being served by a plurality of eNBs (i.e., dual connectivity).

For example, a UE is configured with a Master Evolved NodeB (MeNB) and at least one Secondary eNB (SeNB), where in the dual connectivity application scenario, at least an S1-MME (MME stands for a Mobility Management Entity, and S1 represents an S1 interface to the MME) is terminated at the MeNB, so the MeNB can be regarded as a mobile anchor; and the SeNB is responsible for providing the UE with an additional radio resource in addition to the MeNB, from the prospective of a core network.

In the dual connectivity scenario, frame structures applied to cells and/or carriers scheduled by different eNBs may or may not be the same. For example, a Frequency Division Duplex (FDD) frame structure is applied to the respective carriers scheduled by the different eNBs for the UE, or a Time Division Duplex (TDD) frame structure is applied to the respective carriers scheduled by the different eNBs for the UE (where TDD uplink/downlink configurations applied to the respective carriers scheduled by the different eNBs may or may not be the same), or an FDD frame structure is applied to respective carriers of the UE in one frequency band, and a TDD frame structure is applied to respective carriers of the UE in another frequency band.

In the dual connectivity scenario, the plurality of eNBs with which the UE is connected schedule their respective sets of downlink carriers separately, where data can be scheduled and transmitted to the UE in the following three options:

In a first option, bearers of the MeNB are routed directly to the MeNB from a gateway (e.g., a Serving Gateway (S-GW)); and bearers of the SeNB are routed directly to the SeNB from the gateway, that is, the bearers of the SeNB need not be routed through the MeNB, as illustrated in FIG. 1;

In a second option, bearers of the MeNB are routed directly to the MeNB from a gateway; and bearers of the SeNB are firstly routed to the MeNB from the gateway, and then all the bearers are offloaded by the MeNB to the SeNB, that is, the bearers of the SeNB are not separated, as illustrated in FIG. 2; and In a third option, bearers of the MeNB are routed directly to the MeNB from a gateway; and bearers of the SeNB are firstly routed to the MeNB from the gateway, and then a part of the bearers are offloaded by the MeNB to the SeNB, whereas the remaining bearers are still transmitted at the MeNB side, that is, the bearers of the SeNB are separated, as illustrated in FIG. 3.

At present the UE operates while being served by only one eNB, where Power Control (PC) parameters thereof are configured by the eNB, and the UE is configured with only one set of PC parameters for calculating transmit power of uplink channels including a Physical Uplink Control Channel (PUCCH), a Physical Uplink Shared Channel (PUSCH), a Sounding Reference Signal (SRS), a Physical Random Access Channel (PRACH), etc., where the set of PC parameters are determined for a transmission characteristic between the UE and the one eNB, and also Path Loss (PL) measurement is made only for the one eNB.

Moreover a PUCCH is transmitted only over a primary carrier, and there is only one PUCCH; and for a PUSCH, there is only one PUSCH over which transmission of uplink control information can be carried. Thus if the UE is limited in power, then the priority of the PUCCH will be defined higher than the priority of the PUSCH over which uplink control information is carried, and the priority of the PUSCH over which uplink control information is carried will be defined higher than the priority of a PUSCH over which no uplink control information is carried, so that transmit power of the uplink control information will not be reduced so as to be transmitted reliably.

At present in the dual connectivity scenario, in order to feed back uplink control information corresponding to a plurality of eNBs concurrently over one uplink carrier, the UE may need to transmit a plurality of PUCCHs or PUSCHs over which uplink control information is carried, concurrently over the one uplink carrier, or transmit uplink control information corresponding to a plurality of eNBs, concurrently over one PUCCH or PUSCH, and since there may be different frequencies at which the different eNBs operate, and different propagation paths and transmit channel states between the UE and the different eNBs, the existing solutions to PC parameter configuration, PL measurement, and power reduction will not be applicable any longer in this situation.

In summary, there has not been so far a corresponding solution to uplink power control on a UE transmitting in the uplink in the dual connectivity scenario.

SUMMARY

Embodiments of the invention provide a method and apparatus for controlling uplink power so as to address the problem that there has not been so far a corresponding solution to uplink power control on a UE transmitting in the uplink in the dual connectivity scenario.

An embodiment of the invention provides a method for controlling uplink power, the method including:

determining, by a UE, uplink information to be transmitted over one uplink carrier, wherein the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and determining, by the UE, transmit power of at least one uplink channel carrying the uplink information, according to at least one set of pre-configured power control parameters for calculating transmit power of an uplink channel carrying the uplink information, and transmitting the corresponding uplink information in the at least one uplink channel over the one uplink carrier at the transmit power of the at least one uplink channel.

The embodiment of the invention provides the method for controlling transmit power of the UE transmitting uplink information scheduled by different eNBs, over one uplink carrier so that the UE can transmit the uplink information corresponding to the different eNBs over the one uplink carrier at more reasonable transmit power to thereby avoid being limited in power so as to improve the utilization ratio of power and the transmission efficiency.

In an embodiment of the invention, the uplink information corresponding to the first eNB includes at least one of: first uplink control information corresponding to the first type of carrier, first uplink data scheduled by the first eNB and transmitted over a PUSCH, and an SRS corresponding to the first eNB, wherein the first uplink control information includes at least one of ACK/NACK feedback information, CSI feedback information, and SR information, wherein the CSI feedback information includes at least one of a CQI, a PMI, an RI, and a PTI; and the uplink information corresponding to the second eNB includes at least one of: second uplink control information corresponding to the second type of carrier, second uplink data scheduled by the second eNB and transmitted over a PUSCH, and an SRS corresponding to the second eNB, wherein the second uplink control information includes at least one of ACK/NACK feedback information, CSI feedback information, and SR information, wherein the CSI feedback information includes at least one of a CQI, a PMI, an RI, and a PTI.

In an implementation, determining, by the UE, the transmit power of the at least one uplink channel carrying the uplink information, according to the at least one set of pre-configured power control parameters for calculating transmit power of an uplink channel carrying the uplink information, and transmitting the corresponding uplink information in the at least one uplink channel over the one uplink carrier at the transmit power of the at least one uplink channel includes:

as a first approach, determining, by the UE, transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmitting the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with only one set of power control parameters for calculating transmit power of that type of uplink channel; or as a second approach, determining, by the UE, transmit power of one uplink channel carrying uplink information corresponding to k different eNBs concurrently, according to k sets of pre-configured power control parameters for calculating transmit power of an uplink channel carrying the uplink information, and transmitting the uplink information corresponding to eNBs for which the uplink information needs to be transmitted in the current uplink subframe, among the k different eNBs in the one uplink channel over the one uplink carrier at the transmit power of the one uplink channel, wherein for each type of uplink channel carrying the uplink information, the UE is configured with k sets of power control parameters for calculating transmit power of that type of uplink channel, wherein k represents the number of eNBs serving the UE; or as a third approach, determining, by the UE, transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmitting the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with two sets of power control parameters for calculating transmit power of that type of uplink channel; or as a fourth approach, determining, by the UE, transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmitting the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with only one set of power control parameters for calculating transmit power of that type of uplink channel; or as a fifth approach, determining, by the UE, transmit powers of k uplink channels carrying uplink information corresponding to k different eNBs, respectively according to k sets of pre-configured power control parameters for calculating transmit power of an uplink channel carrying the uplink information, and transmitting the uplink information corresponding to the k-th eNB in the k-th uplink channel over the one uplink carrier at the transmit power of the k-th uplink channel, wherein for each type of uplink channel carrying the uplink information, the UE is configured with k sets of power control parameters for calculating transmit power of that type of uplink channel, wherein k represents the number of eNBs serving the UE; or as a sixth approach, determining, by the UE, transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmitting the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with two sets of power control parameters for calculating transmit power of that type of uplink channel.

For the first approach, determining, by the UE, the transmit power of the one uplink channel carrying the uplink information corresponding to the first eNB, and the uplink information corresponding to the second eNB concurrently, according to the one set of pre-configured power control parameters includes:

determining, by the UE, a Path Loss (PL) corresponding to the one uplink carrier based upon a pre-configured or pre-defined reference carrier, and determining the transmit power of the one uplink channel according to the one set of pre-configured power control parameters, and the PL.

For the second approach, determining, by the UE, the transmit power of the one uplink channel carrying the uplink information corresponding to the k different eNBs concurrently, according to the k sets of pre-configured power control parameters includes:

determining, by the UE, a PL corresponding to the one uplink carrier based upon a pre-configured or pre-defined reference carrier; determining k target transmit powers respectively according to the k sets of pre-configured power control parameters, and the PL; and taking the largest one or the average of the k target transmit powers as the transmit power of the one uplink channel; or determining, by the UE, k PLs corresponding to the one uplink carrier respectively based upon a pre-configured or pre-defined reference carrier, wherein each PL corresponds to one of the k sets of pre-configured power control parameters; determining k target transmit powers respectively according to the k sets of pre-configured power control parameters, and the k PLs respectively corresponding to the k sets of pre-configured power control parameters; and taking the largest one or the average of the k target transmit powers as the transmit power of the one uplink channel.

For the third approach, determining, by the UE, the transmit power of the one uplink channel carrying the uplink information corresponding to the first eNB, and the uplink information corresponding to the second eNB concurrently, according to the two sets of pre-configured power control parameters includes:

determining, by the UE, a PL corresponding to the one uplink carrier based upon a pre-configured or pre-defined reference carrier; to determine first target transmit power according to a first one of the two sets of pre-configured power control parameters, and the PL, and determining second target transmit power according to a second one of the two sets of pre-configured power control parameters, and the PL; and taking the larger one or the average of the determined two target transmit powers as the transmit power of the one uplink channel; or determining, by the UE, a first PL and a second PL corresponding to the one uplink carrier respectively based upon a pre-configured or pre-defined reference carrier, wherein the first PL corresponds to a first one of the two sets of pre-configured power control parameters, and the second PL corresponds to a second one of the two sets of pre-configured power control parameters; determining first target transmit power according to the first one of the two sets of pre-configured power control parameters, and the first PL, and determining second target transmit power according to the second one of the two sets of pre-configured power control parameters, and the second PL; and taking the larger one or the average of the determined two target transmit powers as the transmit power of the one uplink channel.

For the fourth approach, determining, by the UE, the transmit power of the first uplink channel carrying the uplink information corresponding to the first eNB, and the transmit power of the second uplink channel carrying the uplink information corresponding to the second eNB, respectively according to the one set of pre-configured power control parameters includes:

determining, by the UE, a PL corresponding to the one uplink carrier based upon a pre-configured or pre-defined reference carrier; determining target transmit power according to the one set of pre-configured power control parameters, and the PL; and taking the determined target transmit power as the transmit power of the first uplink channel, and the transmit power of the second uplink channel; or determining, by the UE, a first PL and a second PL corresponding to the one uplink carrier respectively based upon the pre-configured or pre-defined reference carrier; and determining the transmit power of the first uplink channel according to the one set of pre-configured power control parameters, and the first PL corresponding to the one uplink carrier, and determining the transmit power of the second uplink channel according to the one set of pre-configured power control parameters, and the second PL corresponding to the one uplink carrier.

For the fifth approach, determining, by the UE, the transmit powers of the k uplink channels carrying the uplink information corresponding to the k different eNBs, respectively according to the k sets of pre-configured power control parameters includes:

determining, by the UE, a PL corresponding to the one uplink carrier based upon a pre-configured or pre-defined reference carrier, and determining the transmit powers of the k uplink channels carrying the uplink information corresponding to the k different eNBs, respectively according to the k sets of pre-configured power control parameters, and the PL; or determining, by the UE, k PLs corresponding to the one uplink carrier based upon a pre-configured or pre-defined reference carrier, wherein each PL corresponds to one of the k sets of pre-configured power control parameters; and determining the transmit powers of the k uplink channels carrying the uplink information corresponding to the k different eNBs, respectively according to the k sets of pre-configured power control parameters, and the k PLs respectively corresponding to the k sets of pre-configured power control parameters.

For the sixth approach, determining, by the UE, the transmit power of the first uplink channel carrying the uplink information corresponding to the first eNB, and the transmit power of the second uplink channel carrying the uplink information corresponding to the second eNB respectively according to the two sets of pre-configured power control parameters includes:

determining, by the UE, a PL corresponding to the one uplink carrier based upon a pre-configured or pre-defined reference carrier; and determining the transmit power of the first uplink channel according to a first one of the two sets of pre-configured power control parameters, and the PL, and determining the transmit power of the second uplink channel according to a second one of the two sets of pre-configured power control parameters, and the PL; or determining, by the UE, a first PL and a second PL corresponding to the one uplink carrier respectively based upon a pre-configured or pre-defined reference carrier; and determining the transmit power of the first uplink channel according to a first one of the two sets of pre-configured power control parameters, and the first PL, and determining the transmit power of the second uplink channel according to a second one of the two sets of pre-configured power control parameters, and the second PL.

In the first approach to the sixth approach, in an implementation, determining, by the UE, the PL corresponding to the one uplink carrier based upon the pre-configured or pre-defined reference carrier includes:

obtaining, by the UE, a reference signal received power according to downlink data transmitted over the reference carrier by the first eNB, or the second eNB, or another eNB serving the UE other than the first eNB and the second eNB, and determining the PL corresponding to the one uplink carrier according to the reference signal received power, a pre-configured higher-layer filter parameter, and a reference signal power corresponding to the reference carrier;

or determining, by the UE, the k PLs corresponding to the one uplink carrier based upon the pre-configured or pre-defined reference carrier includes:

obtaining, by the UE, k reference signal received powers according to downlink data transmitted over the reference carrier respectively by the k different eNBs serving the UE, and determining the k PLs corresponding to the one uplink carrier respectively according to the k reference signal received powers, a pre-configured higher-layer filter parameter, and a reference signal power corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, k pre-configured higher-layer filter parameters, and a reference signal power corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, a pre-configured higher-layer filter parameter, and k reference signal powers corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, k pre-configured higher-layer filter parameters, and k reference signal powers corresponding to the reference carrier;

or determining, by the UE, the first PL and the second PL corresponding to the one uplink carrier based upon the pre-configured or pre-defined reference carrier includes:

obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a pre-configured higher-layer filter parameter, and a reference signal power corresponding to the reference carrier, and determining the second PL according to the second reference signal received power, the pre-configured higher-layer filter parameter, and the reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a first pre-configured higher-layer filter parameter, and a reference signal power corresponding to the reference carrier, and determining the second PL according to the second reference signal received power, a second pre-configured higher-layer filter parameter, and the reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a pre-configured higher-layer filter parameter, and a first reference signal power corresponding to the reference carrier, and determining the second PL according to the second reference signal received power, the pre-configured higher-layer filter parameter, and a second reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a first pre-configured higher-layer filter parameter, and a first reference signal power corresponding to the reference carrier, and determining the second PL according to the second reference signal received power, a second pre-configured higher-layer filter parameter, and a second reference signal power corresponding to the reference carrier.

In an embodiment of the invention, the reference carrier is:

a downlink primary carrier of the UE; or a downlink carrier in a pairing relationship with the one uplink carrier; or a downlink carrier pre-configured in higher-layer signaling.

Furthermore for the first approach or the third approach, if a power adjustment value obtained from a Transmit Power Control (TPC) command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the method further includes:

determining, by the UE, the power adjustment value corresponding to the one uplink channel by accumulating only TPC commands corresponding to the one uplink channel, carried in Physical Downlink Control Channels (PDCCHs) or Enhanced Physical Downlink Control Channels (EPDCCHs) transmitted by the first eNB; or determining, by the UE, the power adjustment value corresponding to the one uplink channel by accumulating only TPC commands corresponding to the one uplink channel, carried in PDCCHs or EPDCCHs transmitted by the second eNB; or determining, by the UE, the power adjustment value corresponding to the one uplink channel by accumulating TPC commands corresponding to the one uplink channel, carried in PDCCHs transmitted by the first eNB and the second eNB; or determining, by the UE, the power adjustment value corresponding to the one uplink channel by accumulating TPC commands corresponding to the one uplink channel, carried in EPDCCHs transmitted by the first eNB and the second eNB;

for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the method further includes:

determining, by the UE, the power adjustment value corresponding to the one uplink channel by accumulating only TPC commands corresponding to the one uplink channel, carried in PDCCHs or EPDCCHs transmitted by the first eNB; or determining, by the UE, the power adjustment value corresponding to the one uplink channel by accumulating only TPC commands corresponding to the one uplink channel, carried in PDCCHs or EPDCCHs transmitted by the second eNB; or determining, by the UE, the power adjustment value corresponding to the one uplink channel by accumulating only TPC commands corresponding to the one uplink channel, carried in PDCCHs or EPDCCHs transmitted by predefined one of the k different eNBs; or determining, by the UE, the power adjustment value corresponding to the one uplink channel by accumulating TPC commands corresponding to the one uplink channel, carried in PDCCHs transmitted by the first eNB and the second eNB; or determining, by the UE, the power adjustment value corresponding to the one uplink channel by accumulating TPC commands corresponding to the one uplink channel, carried in EPDCCHs transmitted by the first eNB and the second eNB; or determining, by the UE, the power adjustment value corresponding to the one uplink channel by accumulating TPC commands corresponding to the one uplink channel, carried in PDCCHs transmitted by the k different eNBs; or determining, by the UE, the power adjustment value corresponding to the one uplink channel by accumulating TPC commands corresponding to the one uplink channel, carried in EPDCCHs transmitted by the k different eNBs;

for the fourth approach or the sixth approach, if a power adjustment value obtained from a TPC command, corresponding to the first uplink channel is determined in an accumulative manner, and the power adjustment value is used for calculating the transmit power of the first uplink channel, then the method further includes: determining, by the UE, the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the method further includes: determining, by the UE, the power adjustment value corresponding to the second uplink channel by accumulating only TPC commands corresponding to the second uplink channel, carried in PDCCHs or EPDCCHs transmitted by the second eNB; or for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the method further includes: determining, by the UE, the power adjustment value corresponding to the k-th uplink channel by accumulating only TPC commands corresponding to the k-th uplink channel, carried in PDCCHs or EPDCCHs transmitted by the k-th eNB.

In an implementation, for the fourth approach or the sixth approach, if the UE transmits the first uplink channel carrying the uplink information corresponding to the first eNB, and the second uplink channel carrying the uplink information corresponding to the second eNB, in the same uplink subframe of the one uplink carrier, and total transmit power in the uplink subframe exceeds maximum transmit power of the one uplink carrier, or maximum transmit power of the UE, then the method further includes:

scaling, by the UE, the power of the first uplink channel and the second uplink channel at the same proportion so that the current total transmit power in the uplink subframe does not exceed either the maximum transmit power of the one uplink carrier, or the maximum transmit power of the UE; or scaling, by the UE, the power of the first uplink channel and/or the second uplink channel according to pre-defined priorities so that the current total transmit power in the uplink subframe does not exceed either the maximum transmit power of the one uplink carrier, or the maximum transmit power of the UE; or for the fifth approach, if the UE transmits the k uplink channels carrying the uplink information corresponding to the k different eNBs in the same uplink subframe of the one uplink carrier, and total transmit power in the uplink subframe exceeds maximum transmit power of the one uplink carrier, or maximum transmit power of the UE, then the method further includes:

scaling, by the UE, the power of the k uplink channels at the same proportion so that the current total transmit power in the uplink subframe does not exceed either the maximum transmit power of the one uplink carrier, or the maximum transmit power of the UE; or scaling, by the UE, the power of several uplink channels of the k uplink channels according to pre-defined priorities so that the current total transmit power in the uplink subframe does not exceed either the maximum transmit power of the one uplink carrier, or the maximum transmit power of the UE.

In an embodiment of the invention, the first eNB is a Master evolved NodeB (MeNB), and the second eNB is a Secondary evolved NodeB (SeNB); or the first eNB is an SeNB, and the second eNB is an MeNB; or the first eNB is an eNB of a macro cell, and the second eNB is an eNB of a small cell; or the first eNB is an eNB of a small cell, and the second eNB is an eNB of a macro cell; or the first eNB is an eNB serving a Primary Component Carrier (PCC) of the UE, and the second eNB is an eNB serving at least one Secondary Component Carrier (SCC) of the UE.

In an embodiment of the invention, the one uplink carrier is:

only one uplink carrier over which uplink data are transmitted, configured by the network side for the UE; or pre-defined or pre-configured one of a plurality of uplink carriers over which uplink data are transmitted, configured by the network side for the UE; or an uplink primary carrier of the UE.

An embodiment of the invention provides a UE including:

a first processing module configured to determine uplink information to be transmitted over one uplink carrier, wherein the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and a second processing module configured to determine transmit power of at least one uplink channel carrying the uplink information, according to at least one set of pre-configured power control parameters for calculating transmit power of an uplink channel carrying the uplink information, and to transmit the corresponding uplink information in the at least one uplink channel over the one uplink carrier at the transmit power of the at least one uplink channel.

In the embodiment of the invention, the UE can transmit the uplink information scheduled by the different eNBs, over the one uplink carrier by transmitting the corresponding uplink information at more reasonable transmit power to thereby avoid being limited in power so as to improve the utilization ratio of power and the transmission efficiency.

In an implementation, the second processing module performs one of the following approaches:

as a first approach, the second processing module determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with only one set of power control parameters for calculating transmit power of that type of uplink channel; or as a second approach, the second processing module determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel, wherein for each type of uplink channel carrying the uplink information, the UE is configured with k sets of power control parameters for calculating transmit power of that type of uplink channel, wherein k represents the number of eNBs serving the UE; or as a third approach, the second processing module determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with two sets of power control parameters for calculating transmit power of that type of uplink channel; or as a fourth approach, the second processing module determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with only one set of power control parameters for calculating transmit power of that type of uplink channel; or as a fifth approach, the second processing module determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, wherein for each type of uplink channel carrying the uplink information, the UE is configured with k sets of power control parameters for calculating transmit power of that type of uplink channel, wherein k represents the number of eNBs serving the UE; or as a sixth approach, the second processing module determines transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with two sets of power control parameters for calculating transmit power of that type of uplink channel.

In an implementation, for the first approach, the second processing module is configured:

to determine a Path Loss (PL) corresponding to the one uplink carrier based upon a pre-configured or pre-defined reference carrier, and to determine the transmit power of the one uplink channel according to the one set of pre-configured power control parameters, and the PL.

In an implementation, for the second approach, the second processing module is configured:

to determine a PL corresponding to the one uplink carrier based upon a pre-configured or pre-defined reference carrier; to determine k target transmit powers respectively according to the k sets of pre-configured power control parameters, and the PL; and to take the largest one or the average of the k target transmit powers as the transmit power of the one uplink channel; or to determine k PLs corresponding to the one uplink carrier respectively based upon a pre-configured or pre-defined reference carrier, wherein each PL corresponds to one of the k sets of pre-configured power control parameters; to determine k target transmit powers respectively according to the k sets of pre-configured power control parameters, and the k PLs respectively corresponding to the k sets of pre-configured power control parameters; and to take the largest one or the average of the k target transmit powers as the transmit power of the one uplink channel.

In an implementation, for the third approach, the second processing module is configured:

to determine a PL corresponding to the one uplink carrier based upon a pre-configured or pre-defined reference carrier; to determine first target transmit power according to a first one of the two sets of pre-configured power control parameters, and the PL, and to determine second target transmit power according to a second one of the two sets of pre-configured power control parameters, and the PL; and to take the larger one or the average of the determined two target transmit powers as the transmit power of the one uplink channel; or to determine a first PL and a second PL corresponding to the one uplink carrier respectively based upon a pre-configured or pre-defined reference carrier, wherein the first PL corresponds to a first one of the two sets of pre-configured power control parameters, and the second PL corresponds to a second one of the two sets of pre-configured power control parameters; to determine first target transmit power according to the first one of the two sets of pre-configured power control parameters, and the first PL, and to determine second target transmit power according to the second one of the two sets of pre-configured power control parameters, and the second PL; and to take the larger one or the average of the determined two target transmit powers as the transmit power of the one uplink channel.

In an implementation, for the fourth approach, the second processing module is configured:

to determine a PL corresponding to the one uplink carrier based upon a pre-configured or pre-defined reference carrier; to determine target transmit power according to the one set of pre-configured power control parameters, and the PL; and to take the determined target transmit power as the transmit power of the first uplink channel, and the transmit power of the second uplink channel;

or to determine a first PL and a second PL corresponding to the one uplink carrier respectively based upon the pre-configured or pre-defined reference carrier; and to determine the transmit power of the first uplink channel according to the one set of pre-configured power control parameters, and the first PL corresponding to the one uplink carrier, and to determine the transmit power of the second uplink channel according to the one set of pre-configured power control parameters, and the second PL corresponding to the one uplink carrier.

In an implementation, for the fifth approach, the second processing module is configured:

to determine a PL corresponding to the one uplink carrier based upon a pre-configured or pre-defined reference carrier, and to determine the transmit powers of the k uplink channels carrying the uplink information corresponding to the k different eNBs, respectively according to the k sets of pre-configured power control parameters, and the PL; or to determine k PLs corresponding to the one uplink carrier based upon a pre-configured or pre-defined reference carrier, wherein each PL corresponds to one of the k sets of pre-configured power control parameters; and to determine the transmit powers of the k uplink channels carrying the uplink information corresponding to the k different eNBs, respectively according to the k sets of pre-configured power control parameters, and the k PLs respectively corresponding to the k sets of pre-configured power control parameters.

In an implementation, for the sixth approach, the second processing module is configured:

to determine a PL corresponding to the one uplink carrier based upon a pre-configured or pre-defined reference carrier; and to determine the transmit power of the first uplink channel according to a first one of the two sets of pre-configured power control parameters, and the PL, and to determine the transmit power of the second uplink channel according to a second one of the two sets of pre-configured power control parameters, and the PL; or to determine a first PL and a second PL corresponding to the one uplink carrier respectively based upon a pre-configured or pre-defined reference carrier; and to determine the transmit power of the first uplink channel according to a first one of the two sets of pre-configured power control parameters, and the first PL, and to determine the transmit power of the second uplink channel according to a second one of the two sets of pre-configured power control parameters, and the second PL.

In the first approach to the sixth approach, in an implementation, the second processing module configured to determine the PL corresponding to the one uplink carrier based upon the pre-configured or pre-defined reference carrier is configured:

to obtain a reference signal received power according to downlink data transmitted by the first eNB, or the second eNB, or another eNB serving the UE other than the first eNB and the second eNB over the reference carrier, and to determine the PL corresponding to the one uplink carrier according to the reference signal received power, a pre-configured higher-layer filter parameter, and a reference signal power corresponding to the reference carrier;

or the second processing module configured to determine the k PLs corresponding to the one uplink carrier based upon the pre-configured or pre-defined reference carrier is configured:

to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and k reference signal powers corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and k reference signal powers corresponding to the reference carrier;

or the second processing module configured to determine the first PL and the second PL corresponding to the one uplink carrier based upon the pre-configured or pre-defined reference carrier is configured:

to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a reference signal power corresponding to the reference carrier, and to determine the second PL according to the second reference signal received power, the pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a reference signal power corresponding to the reference carrier, and to determine the second PL according to the second reference signal received power, a second pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a first reference signal power corresponding to the reference carrier, and to determine the second PL according to the second reference signal received power, the pre-configured higher-layer filter parameter, and a second reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a first reference signal power corresponding to the reference carrier, and to determine the second PL according to the second reference signal received power, a second pre-configured higher-layer filter parameter, and a second reference signal power corresponding to the reference carrier.

In an implementation, for the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the second processing module is further configured: to determine the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB;

for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the second processing module is further configured: to determine the power adjustment value corresponding to the one uplink channel by accumulating only TPC commands corresponding to the one uplink channel, carried in PDCCHs or EPDCCHs transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating only TPC commands corresponding to the one uplink channel, carried in PDCCHs or EPDCCHs transmitted by predefined one of the k different eNBs; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB; or to determine the power adjustment value corresponding to the one uplink channel by accumulating TPC commands corresponding to the one uplink channel, carried in PDCCHs transmitted by the k different eNBs; or to determine the power adjustment value corresponding to the one uplink channel by accumulating TPC commands corresponding to the one uplink channel, carried in EPDCCHs transmitted by the k different eNBs;

for the fourth approach or the sixth approach, if a power adjustment value obtained from a TPC command, corresponding to the first uplink channel is determined in an accumulative manner, and the power adjustment value is used for calculating the transmit power of the first uplink channel, then the second processing module is further configured to determine the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the second processing module is further configured to determine the power adjustment value corresponding to the second uplink channel by accumulating only TPC commands corresponding to the second uplink channel, carried in PDCCHs or EPDCCHs transmitted by the second eNB; and for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the second processing module is further configured to determine the power adjustment value corresponding to the k-th uplink channel by accumulating only TPC commands corresponding to the k-th uplink channel, carried in PDCCHs or EPDCCHs transmitted by the k-th eNB.

In an implementation, for the fourth approach or the sixth approach, if the first uplink control information and the second uplink control information is transmitted in the same uplink subframe of the one uplink carrier, and total transmit power in the uplink subframe exceeds maximum transmit power of the one uplink carrier, or maximum transmit power of the UE, then preferably the second processing module is further configured:

to scale the power of the first uplink channel and the second uplink channel at the same proportion so that the current total transmit power in the uplink subframe does not exceed either the maximum transmit power of the one uplink carrier, or the maximum transmit power of the UE; or to scale the power of the first uplink channel and/or the second uplink channel according to pre-defined priorities so that the current total transmit power in the uplink subframe does not exceed either the maximum transmit power of the one uplink carrier, or the maximum transmit power of the UE;

or for the fifth approach, if the k uplink channels carrying the uplink information corresponding to the k different eNBs is transmitted in the same uplink subframe of the one uplink carrier, and total transmit power in the uplink subframe exceeds maximum transmit power of the one uplink carrier, or maximum transmit power of the UE, then the second processing module is further configured:

to scale the power of the k uplink channels at the same proportion so that the current total transmit power in the uplink subframe does not exceed either the maximum transmit power of the one uplink carrier, or the maximum transmit power of the UE; or to scale the power of several uplink channels of the k uplink channels according to pre-defined priorities so that the current total transmit power in the uplink subframe does not exceed either the maximum transmit power of the one uplink carrier, or the maximum transmit power of the UE.

An embodiment of the invention further provides a UE including a transceiver, and at least one processor connected with the transceiver, wherein:

the processor is configured to determine uplink information to be transmitted over one uplink carrier, wherein the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and to determine transmit power of at least one uplink channel carrying the uplink information, according to at least one set of pre-configured power control parameters for calculating transmit power of an uplink channel carrying the uplink information, and to trigger the transceiver to transmit the corresponding uplink information in the at least one uplink channel over the one uplink carrier at the transmit power of the at least one uplink channel.

In the embodiment of the invention, the UE can transmit the uplink information scheduled by the different eNBs, over the one uplink carrier by transmitting the corresponding uplink information at more reasonable transmit power to thereby avoid being limited in power so as to improve the utilization ratio of power and the transmission efficiency.

In an implementation, the processor performs one of the following approaches:

as a first approach, the processor determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with only one set of power control parameters for calculating transmit power of that type of uplink channel; or as a second approach, the processor determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel, wherein for each type of uplink channel carrying the uplink information, the UE is configured with k sets of power control parameters for calculating transmit power of that type of uplink channel, wherein k represents the number of eNBs serving the UE; or as a third approach, the processor determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with two sets of power control parameters for calculating transmit power of that type of uplink channel; or as a fourth approach, the processor determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with only one set of power control parameters for calculating transmit power of that type of uplink channel; or as a fifth approach, the processor determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, wherein for each type of uplink channel carrying the uplink information, the UE is configured with k sets of power control parameters for calculating transmit power of that type of uplink channel, wherein k represents the number of eNBs serving the UE; or as a sixth approach, the processor determines transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with two sets of power control parameters for calculating transmit power of that type of uplink channel.

In an implementation, for the first approach, the processor configured to determine the transmit power of the one uplink channel carrying the uplink information corresponding to the first eNB, and the uplink information corresponding to the second eNB concurrently, according to the one set of pre-configured power control parameters is configured:

to determine a Path Loss (PL) corresponding to the one uplink carrier based upon a pre-configured or pre-defined reference carrier, and to determine the transmit power of the one uplink channel according to the one set of pre-configured power control parameters, and the PL.

In an implementation, for the second approach, the processor configured to determine the transmit power of the one uplink channel carrying the uplink information corresponding to the k different eNBs concurrently, according to the k sets of pre-configured power control parameters is configured:

to determine a PL corresponding to the one uplink carrier based upon a pre-configured or pre-defined reference carrier; to determine k target transmit powers respectively according to the k sets of pre-configured power control parameters, and the PL; and to take the largest one or the average of the k target transmit powers as the transmit power of the one uplink channel; or to determine k PLs corresponding to the one uplink carrier respectively based upon a pre-configured or pre-defined reference carrier, wherein each PL corresponds to one of the k sets of pre-configured power control parameters; to determine k target transmit powers respectively according to the k sets of pre-configured power control parameters, and the k PLs respectively corresponding to the k sets of pre-configured power control parameters; and to take the largest one or the average of the k target transmit powers as the transmit power of the one uplink channel.

In an implementation, for the third approach, the processor configured to determine the transmit power of the one uplink channel carrying the uplink information corresponding to the first eNB, and the uplink information corresponding to the second eNB concurrently, according to the two sets of pre-configured power control parameters is configured:

to determine a PL corresponding to the one uplink carrier based upon a pre-configured or pre-defined reference carrier; to determine first target transmit power according to a first one of the two sets of pre-configured power control parameters, and the PL, and to determine second target transmit power according to a second one of the two sets of pre-configured power control parameters, and the PL; and to take the larger one or the average of the determined two target transmit powers as the transmit power of the one uplink channel; or to determine a first PL and a second PL corresponding to the one uplink carrier respectively based upon a pre-configured or pre-defined reference carrier, wherein the first PL corresponds to a first one of the two sets of pre-configured power control parameters, and the second PL corresponds to a second one of the two sets of pre-configured power control parameters; to determine first target transmit power according to the first one of the two sets of pre-configured power control parameters, and the first PL, and to determine second target transmit power according to the second one of the two sets of pre-configured power control parameters, and the second PL; and to take the larger one or the average of the determined two target transmit powers as the transmit power of the one uplink channel.

In an implementation, for the fourth approach, the processor configured to determine the transmit power of the first uplink channel carrying the uplink information corresponding to the first eNB, and the transmit power of the second uplink channel carrying the uplink information corresponding to the second eNB, respectively according to the one set of pre-configured power control parameters is configured:

to determine a PL corresponding to the one uplink carrier based upon a pre-configured or pre-defined reference carrier; to determine target transmit power according to the one set of pre-configured power control parameters, and the PL; and to take the determined target transmit power as the transmit power of the first uplink channel, and the transmit power of the second uplink channel;

or to determine a first PL and a second PL corresponding to the one uplink carrier respectively based upon the pre-configured or pre-defined reference carrier; and to determine the transmit power of the first uplink channel according to the one set of pre-configured power control parameters, and the first PL corresponding to the one uplink carrier, and to determine the transmit power of the second uplink channel according to the one set of pre-configured power control parameters, and the second PL corresponding to the one uplink carrier.

In an implementation, for the fifth approach, the processor configured to determine the transmit powers of the k uplink channels carrying the uplink information corresponding to the k different eNBs, respectively according to the k sets of pre-configured power control parameters is configured:

to determine a PL corresponding to the one uplink carrier based upon a pre-configured or pre-defined reference carrier, and to determine the transmit powers of the k uplink channels carrying the uplink information corresponding to the k different eNBs, respectively according to the k sets of pre-configured power control parameters, and the PL; or to determine k PLs corresponding to the one uplink carrier based upon a pre-configured or pre-defined reference carrier, wherein each PL corresponds to one of the k sets of pre-configured power control parameters; and to determine the transmit powers of the k uplink channels carrying the uplink information corresponding to the k different eNBs, respectively according to the k sets of pre-configured power control parameters, and the k PLs respectively corresponding to the k sets of pre-configured power control parameters.

In an implementation, for the sixth approach, the processor configured to determine the transmit power of the first uplink channel carrying the uplink information corresponding to the first eNB, and the transmit power of the second uplink channel carrying the uplink information corresponding to the second eNB respectively according to the two sets of pre-configured power control parameters is configured:

to determine a PL corresponding to the one uplink carrier based upon a pre-configured or pre-defined reference carrier; and to determine the transmit power of the first uplink channel according to a first one of the two sets of pre-configured power control parameters, and the PL, and to determine the transmit power of the second uplink channel according to a second one of the two sets of pre-configured power control parameters, and the PL; or to determine a first PL and a second PL corresponding to the one uplink carrier respectively based upon a pre-configured or pre-defined reference carrier; and to determine the transmit power of the first uplink channel according to a first one of the two sets of pre-configured power control parameters, and the first PL, and to determine the transmit power of the second uplink channel according to a second one of the two sets of pre-configured power control parameters, and the second PL.

In the first approach to the sixth approach, the processor configured to determine the PL corresponding to the one uplink carrier based upon the pre-configured or pre-defined reference carrier is configured:

to obtain a reference signal received power according to downlink data transmitted by the first eNB, or the second eNB, or another eNB serving the UE other than the first eNB and the second eNB over the reference carrier, and to determine the PL corresponding to the one uplink carrier according to the reference signal received power, a pre-configured higher-layer filter parameter, and a reference signal power corresponding to the reference carrier;

or the processor configured to determine the k PLs corresponding to the one uplink carrier based upon the pre-configured or pre-defined reference carrier is configured:

to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and k reference signal powers corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and k reference signal powers corresponding to the reference carrier;

or the processor configured to determine the first PL and the second PL corresponding to the one uplink carrier based upon the pre-configured or pre-defined reference carrier is configured:

to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a reference signal power corresponding to the reference carrier, and to determine the second PL according to the second reference signal received power, the pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a reference signal power corresponding to the reference carrier, and to determine the second PL according to the second reference signal received power, a second pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a first reference signal power corresponding to the reference carrier, and to determine the second PL according to the second reference signal received power, the pre-configured higher-layer filter parameter, and a second reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a first reference signal power corresponding to the reference carrier, and to determine the second PL according to the second reference signal received power, a second pre-configured higher-layer filter parameter, and a second reference signal power corresponding to the reference carrier.

In an embodiment of the invention, for the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the processor is further configured: to determine the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB.

In an embodiment of the invention, for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the processor is further configured: to determine the power adjustment value corresponding to the one uplink channel by accumulating only TPC commands corresponding to the one uplink channel, carried in PDCCHs or EPDCCHs transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating only TPC commands corresponding to the one uplink channel, carried in PDCCHs or EPDCCHs transmitted by pre-defined one of the k different eNBs; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB; or to determine the power adjustment value corresponding to the one uplink channel by accumulating TPC commands corresponding to the one uplink channel, carried in PDCCHs transmitted by the k different eNBs; or to determine the power adjustment value corresponding to the one uplink channel by accumulating TPC commands corresponding to the one uplink channel, carried in EPDCCHs transmitted by the k different eNBs.

In an embodiment of the invention, for the fourth approach or the sixth approach, if a power adjustment value obtained from a TPC command, corresponding to the first uplink channel is determined in an accumulative manner, and the power adjustment value is used for calculating the transmit power of the first uplink channel, then the processor is further configured to determine the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the processor is further configured to determine the power adjustment value corresponding to the second uplink channel by accumulating only TPC commands corresponding to the second uplink channel, carried in PDCCHs or EPDCCHs transmitted by the second eNB.

In an embodiment of the invention, for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the processor is further configured to determine the power adjustment value corresponding to the k-th uplink channel by accumulating only TPC commands corresponding to the k-th uplink channel, carried in PDCCHs or EPDCCHs transmitted by the k-th eNB.

In an embodiment of the invention, for the fourth approach or the sixth approach, if the first uplink control information and the second uplink control information is transmitted in the same uplink subframe of the one uplink carrier, and total transmit power in the uplink subframe exceeds maximum transmit power of the one uplink carrier, or maximum transmit power of the UE, then the processor is further configured:

to scale the power of the first uplink channel and the second uplink channel at the same proportion so that the current total transmit power in the uplink subframe does not exceed either the maximum transmit power of the one uplink carrier, or the maximum transmit power of the UE; or to scale the power of the first uplink channel and/or the second uplink channel according to pre-defined priorities so that the current total transmit power in the uplink subframe does not exceed either the maximum transmit power of the one uplink carrier, or the maximum transmit power of the UE.

In an embodiment of the invention, for the fifth approach, if the k uplink channels carrying the uplink information corresponding to the k different eNBs is transmitted in the same uplink subframe of the one uplink carrier, and total transmit power in the uplink subframe exceeds maximum transmit power of the one uplink carrier, or maximum transmit power of the UE, then the processor is further configured:

to scale the power of the k uplink channels at the same proportion so that the current total transmit power in the uplink subframe does not exceed either the maximum transmit power of the one uplink carrier, or the maximum transmit power of the UE; or to scale the power of several uplink channels of the k uplink channels according to pre-defined priorities so that the current total transmit power in the uplink subframe does not exceed either the maximum transmit power of the one uplink carrier, or the maximum transmit power of the UE.

BRIEF DESCRIPTION OF THE DRAWINGS

FIG. 3 illustrates a schematic diagram of a third scheme to schedule and transmit data to a UE in the dual connectivity scenario in the prior art;

FIG. 4 illustrates a schematic diagram of a method for controlling uplink power according to an embodiment of the invention;

DETAILED DESCRIPTION OF THE EMBODIMENTS

Figure 1:
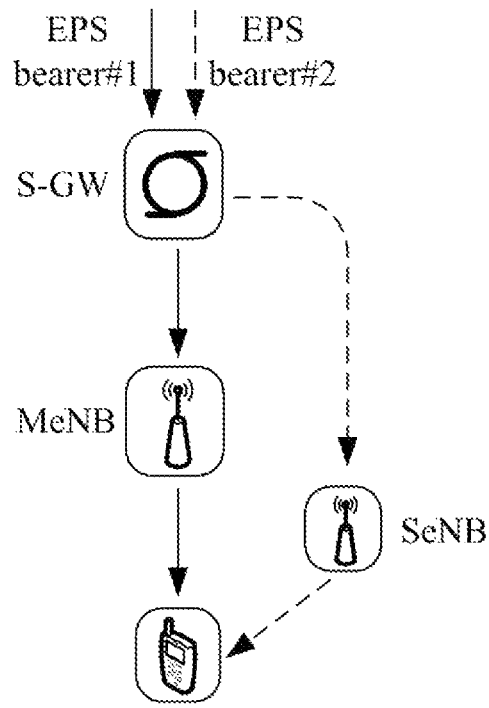
FIG. 1 illustrates a schematic diagram of a first scheme to schedule and transmit data to a UE in the dual connectivity scenario in the prior art.
Figure 2:
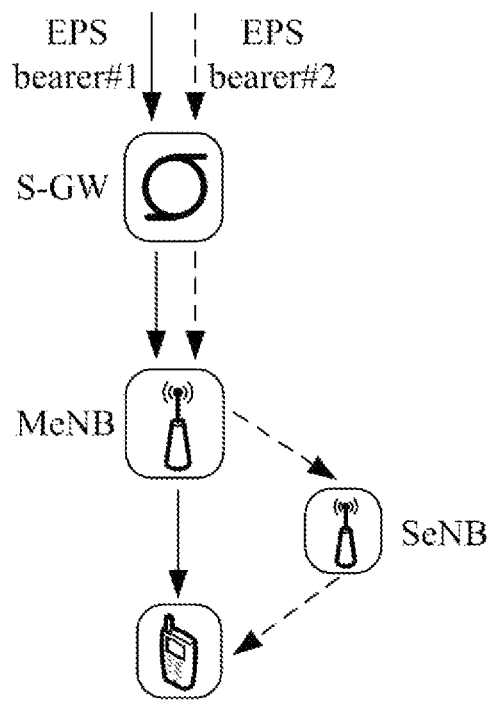
FIG. 2 illustrates a schematic diagram of a second scheme to schedule and transmit data to a UE in the dual connectivity scenario in the prior art.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. All the other embodiments which can occur to those ordinarily skilled in the art based upon the embodiments here in the invention without any inventive effort shall fall into the claimed scope of the invention.

In the embodiments of the invention, for the sake of a description of the technical solutions of the invention, the terms "first", "second", etc., as used here are intended to distinguish different eNBs scheduling data to a UE from each other, and downlink carriers scheduled by the different eNBs from each other, but not intended to limit the numbers and operating priorities of the eNBs and the downlink carriers.

For example, if a first eNB refers to a Master evolved NodeB (MeNB) of the UE, then a second eNB can refer to a Secondary evolved NodeB (SeNB) of the UE, or can refer to all the SeNBs of the UE.

In an embodiment of the invention, the first eNB and the second eNB can be particularly as follows:

The first eNB is a Master evolved NodeB (MeNB), and the second eNB is a Secondary evolved NodeB (SeNB); or The first eNB is an SeNB, and the second eNB is an MeNB; or The first eNB is an eNB of a macro cell, and the second eNB is an eNB of a small cell; or The first small is an eNB of a small cell, and the second small is an eNB of a macro cell; or The first eNB is an eNB serving a Primary Component Carrier (PCC) of the UE, and the second eNB is an eNB serving at least one Secondary Component Carrier (SCC) of the UE.

It shall be noted that the first eNB includes at least one eNB scheduling data to the UE; and the second eNB is another eNB than the first eNB, and the second eNB includes at least one eNB scheduling data to the UE.

Particularly the first eNB can refer to an eNB scheduling data to the UE, or can refer to a type of eNB (e.g., a master eNB, a macro eNB, etc.), and if the first eNB refers to a type of eNB, then the number of the first eNBs will be at least one; and alike the second eNB can refer to another one of the eNBs scheduling data to the UE other than the first eNB, or can refer to a type of eNB (e.g., a secondary eNB, an eNB of a small cell, etc.) scheduling data to the UE, and if the second eNB refers to a type of eNB, then the number of the second eNBs will be at least one.

In an embodiment of the invention, a first carrier refers to a downlink carrier scheduled by the first eNB for the UE, and the first carrier can refer to a set of all the downlink carriers scheduled by the first eNB, or can refer to a set of a part of the downlink carriers scheduled by the first eNB, or can refer to any one of the downlink carriers scheduled by the first eNB; and a second carrier refers to a downlink carrier scheduled by the second eNB for the UE, and the second carrier can refer to a set of all the downlink carriers scheduled by the second eNB, or can refer to a set of a part of the downlink carriers scheduled by the second eNB, or can refer to any one of the downlink carriers scheduled by the second eNB Particularly the first carrier and the second carrier may or may not operate at the same frequency.

In an embodiment of the invention, one uplink carrier over which uplink information corresponding to the respective eNBs scheduling data to the UE is transmitted is particularly:

Only one uplink carrier over which uplink data are transmitted, configured by the network side for the UE; or pre-defined or pre-configured one of a plurality of uplink carriers over which uplink data are transmitted, configured by the network side for the UE; or an uplink primary carrier of the UE.

It shall be noted that a network-side device configuring the UE with the uplink carrier or carriers over which uplink data are transmitted can be the first eNB, or can be another eNB than the first eNB, or can be a network-side device which is not an eNB.

In an embodiment of the invention, the network side pre-configures the UE with at least one higher-layer filter parameter in higher-layer signaling, where PL is calculated using the at least one higher-layer filter parameter. Preferably the higher-layer signaling can be Radio Resource Control (RRC) signaling or Media Access Control (MAC) signaling.

Referring to FIG. 4, an embodiment of the invention provides a method for controlling uplink power, which is applicable to a dual connectivity scenario, the method including the following steps:

In the step 41, a UE determines uplink information to be transmitted over one uplink carrier, where the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and In this step, the uplink information corresponding to the different eNBs, to be transmitted over the one uplink carrier can be transmitted in the same one uplink subframe of the one uplink carrier, or can be transmitted in different uplink subframes of the one uplink carrier, dependent upon particular scheduling of the uplink information.

In the step 42, the UE determines transmit power of at least one uplink channel carrying the uplink information, according to at least one set of pre-configured power control parameters for calculating transmit power of an uplink channel carrying the uplink information, and transmits the corresponding uplink information in the at least one uplink channel over the one uplink carrier at the transmit power of the at least one uplink channel.

In the embodiment of the invention, the UE determines uplink information to be transmitted over one pre-configured uplink carrier, where the uplink information includes uplink information corresponding to a first eNB, and uplink information corresponding to a second eNB; and the UE determines transmit power of at least one uplink channel carrying the uplink information, according to at least one set of pre-configured power control parameters, and transmits the corresponding uplink information in the at least one uplink channel over the one uplink carrier at the transmit power of the at least one uplink channel, so the embodiment of the invention provides the method for controlling transmit power of the UE transmitting uplink information scheduled by different eNBs, over one uplink carrier so that the UE transmits the uplink information corresponding to the different eNBs at more reasonable transmit power over the one uplink carrier to thereby avoiding being limited in power so as to improve the utilization ratio of power and the transmission efficiency.

In an implementation, in the step 42, the uplink information corresponding to the different eNBs, to be transmitted over the one uplink carrier can be transmitted concurrently in the same channel, or can be transmitted in different channels, where if the uplink information corresponding to the different eNBs is transmitted in different channels, then the uplink information can be transmitted in the same one uplink subframes of the uplink carrier, or can be transmitted in different uplink subframes of the uplink carrier.

In an embodiment of the invention, the uplink channel includes but will not be limited to the following three types:

A Physical Uplink Control Channel (PUCCH), a Physical Uplink Shared Channel (PUSCH), and an SRS.

In an embodiment of the invention, each set of power control parameters among the at least one set of pre-configured power control parameters for calculating transmit power of an uplink channel carrying the uplink information includes:

All or a part of the following parameters for a PUCCH: a power offset $\Delta_{F\_PUCCH}(F)$ of a respective PUCCH format relative to the PUCCH format 1a, a transmit diversity power offset $\Delta_{TxD}(F')$, initial cell-specific PUCCH transmit power $P_{O\_NOMINAL\_PUCCH}$, and initial UE-specific UCCH transmit power $P_{O\_UE\_PUCCH}$ (where initial PUCCH transmit power $P_{O\_PUCCH}$ over the PCC is the sum of the two initial PUCCH transmit power), where F represents the respective PUCCH format, which can particularly be one of the PUCCH formats 1/1a/1b/2/2a/2b/3;

Preferably the initial UE-specific UCCH transmit power $P_{O\_NOMINAL\_PUCCH}$ can be a parameter common to the plurality of sets of power control parameters, that is, this parameter can be a single parameter common to the plurality of sets of power control parameters;

All or a part of the following parameters for a PUSCH: initial cell-specific PUSCH transmit power $P_{O\_NOMINAL\_PUSCH,c}(j)$, and initial UE-specific PUSCH transmit power $P_{O\_UE\_PUSCH,c}(j)$, in a cell c (where initial PUSCH transmit power in the cell c $P_{O\_PUSCH,c}(j)$ is the sum of the two initial PUSCH transmit power), where j represents a value to distinguish a type of PUSCH transmission so that j=0 represents an SPS PUSCH, j=1 represents a dynamically scheduled PUSCH, and j=2 represents a PUSCH scheduled by an uplink (UL) grant in a random access response, that is $P_{O\_NOMINAL\_PUSCH,c}(j)$ and $P_{O\_UE\_PUSCH,c}(j)$ will be configured with three values respectively; a path loss compensation factor in the cell c $\alpha_c(j)$; a higher-layer parameter pathlossReferenceLinking to indicate a reference carrier for calculating a path loss in the cell c; a higher-layer parameter referenceSignalPower (for calculating a PL) to indicate a reference signal power in the cell c; a higher-layer filter parameter filterCoefficient for calculating a path loss in the cell c; a higher-layer parameter accumulationEnabled to indicate whether a power control adjustment value is accumulative; and a higher-layer parameter deltaMSC-Enabled to indicate whether an MCS power adjustment function is enabled;

Preferably the initial cell-specific PUSCH transmit power $P_{O\_NOMINAL\_PUSCH,c}(j)$ can be a parameter common to the plurality of sets of power control parameters, the higher-layer parameter pathlossReferenceLinking to indicate a reference carrier for calculating a path loss in the cell c can be a parameter common to the plurality of sets of power control parameters, the higher-layer parameter accumulationEnabled to indicate whether a power control adjustment value is accumulative can be a parameter common to the plurality of sets of power control parameters, and the higher-layer parameter deltaMSC-Enabled to indicate whether the MCS power adjustment function is enabled can be a parameter common to the plurality of sets of power control parameters, that is, these parameters can be single parameters common to the plurality of sets of power control parameters; and All or a part of the following parameters for an SRS: a power offset $P_{SRS\_OFFSET,c}(m)$ of the SRS relative to a PUSCH in respective transmission modes (with different antenna ports) in a cell c, where m=0 corresponds to a periodic SRS, and m=1 corresponds to a non-periodic SRS, so that each set of power control parameters includes these two values of the parameter, which correspond respectively to a periodic SRS and a non-periodic SRS.

Moreover in addition to the parameters above, each set of power control parameters can include a higher-layer configured parameter $P_{EMAX,c}(i)$ for calculating maximum transmit power $P_{CMAX,c}(i)$ of each carrier, and maximum transmit power $P_{CMAX}(i)$ of the UE; and of course, these two parameters are parameters common to the plurality of sets of power control parameters, that is, the plurality of sets of power control parameters are configured with only one $P_{EMAX,c}(i)$ and one $P_{CMAX}(i)$.

In an embodiment of the invention, the uplink information corresponding to the first eNB includes at least one of:

First uplink control information corresponding to the first type of carrier, first uplink data scheduled by the first eNB and transmitted over a PUSCH, and a Sounding Reference Signal (SRS) corresponding to the first eNB;

Here the first uplink control information includes but will not be limited to at least one of:

Acknowledgment (ACK)/Negative Acknowledgement (NACK) feedback information, Channel State Information (CSI) feedback information, and Scheduling Request (SR) information, where the CSI feedback information includes but will not be limited to at least one of:

A Channel Quality Indicator (CQI), a Pre-coding Matrix Indicator (PMI), a Rank Indication (RI), and a Pre-coding Type Indicator (PTI).

In an embodiment of the invention, the uplink information corresponding to the second eNB includes at least one of:

Second uplink control information corresponding to the second type of carrier, second uplink data scheduled by the second eNB and transmitted over a PUSCH, and an SRS corresponding to the second eNB;

Here the second uplink control information includes at least one of ACK/NACK feedback information, CSI feedback information, and SR information; and the CSI feedback information includes at least one of a CQI, a PMI, an RI, and a PTI.

In an implementation, in the step 42, the UE determines the transmit power of the at least one uplink channel carrying the uplink information, according to the at least one set of pre-configured power control parameters for calculating transmit power of an uplink channel carrying the uplink information, and transmits the corresponding uplink information in the at least one uplink channel over the one uplink carrier at the transmit power of the at least one uplink channel, particularly in the following six preferred approaches:

As a first approach, the UE determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, where for each type of uplink channel carrying the uplink information, the UE is configured with only one set of power control parameters for calculating transmit power of that type of uplink channel.

This approach is well applicable to an application scenario in which the uplink information to be transmitted is uplink control information, that is, for each type of one uplink channel carrying the uplink information (a PUCCH or a PUSCH), the UE is configured with only one set of power control parameters for calculating transmit power of a PUCCH, and the UE is configured with only one set of power control parameters for calculating transmit power of a PUSCH.

In the first approach, if the uplink information corresponding to the plurality of eNBs needs to be transmitted in the same one uplink channel over the one uplink carrier, then the transmit power will be determined using only one set of power control parameters corresponding to the one uplink channel.

Furthermore in an implementation, in the first approach, the UE determines the transmit power of the one uplink channel in the following steps:

The UE determines a Path Loss (PL) corresponding to the one uplink carrier based upon a pre-configured or pre-defined reference carrier, and determines the transmit power of the one uplink channel according to the one set of pre-configured power control parameters, and the determined PL.

The transmit power can be calculated particularly as follows for different uplink channels:

For a PUCCH, transmit power thereof $P_{PUCCH}(i)$ in a subframe i is determined in Equation 1 of:

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\}; \quad \text{Equation 1}$$

Where $P_{CMAX,c}(i)$ represents cell maximum transmit power in the subframe i in the cell c; $h(n_{CQI}, n_{HARQ}, n_{SR})$ represents a power offset dependent upon the number of bits carried in the PUCCH, where $n_{CQI}$ corresponds to the number of carried CQI bits, $n_{HARQ}$ corresponds to the number of carried ACK/NACK bits, and the formulas h(nC-QI,nHARQ,nSR) represents a well defined formulas corresponding to the respective PUCCH format; and g(i) represents an in an accumulative manner determined power adjustment value obtained from a PUCCH TPC command, that is, $$g(i) = g(i-1) + \sum_{m=0}^{M-1} \delta_{PUCCH}(i - k_m),$$

where $\delta_{PUCCH}$ represents a UE-specific revision value, also referred to a TPC command, included in a PDCCH/EPD-CCH in the DCI format 1A/1B/1D/1/2A/2/2B/2C corresponding to a primary cell, or in a PDCCH/EPDCCH in the DCI format 3/3A together with other UE-specific PUCCH TPCs, and at this time a Cyclic Redundancy Check (CRC) information bit of the PDCCH/EPDCCH is scrambled by a TPC-PUCCH-Radio Network Temporary Identifier (RNTI), where M represents the number of downlink subframes for which ACK/NACK is fed back in the current uplink subframe i, and $k_m$ represents the index of a downlink subframe for which ACK/NACK is fed back in the current uplink subframe i (that is, $k_m$ indicates an offset of the serial number of the downlink subframe relative to the current uplink subframe);

For a PUSCH:

If there is no PUCCH of the UE in a subframe i in the cell c, then transmit power $P_{PUSCH,c}(i)$ of the PUSCH of the UE in the subframe i in the cell c will be calculated in Equation 2 of:

$$P_{PUSCH,c}(i) = \min \left\{ \begin{array}{l} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{array} \right\}; \quad \text{Equation 2}$$

If there is a PUCCH of the UE in a subframe i in the cell c, then transmit power $P_{PUSCH,c}(i)$ of the PUSCH of the UE in the subframe i in the cell c will be calculated in Equation 3 of:

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{array} \right\}; \quad \text{Equation 3}$$

Where $\hat{P}_{CMAX,c}(i)$ represents a linear value of $P_{CMAX,c}(i)$; $\hat{P}_{PUCCH}(i)$ represents a linear value of the corresponding PUCCH transmit power $P_{PUCCH}(i)$ above; $M_{PUSCH,c}(i)$ represents the size of a frequency resource allocated in the PUSCH in the cell c, validated in the subframe i, as the number of Resource Blocks (RBs); if $K_s=1.25$, then $\Delta_{TF,c}(i)=10 \log_{10}((2^{BPRE \cdot K_s}-1) \cdot \beta_{offset}^{PUSCH})$, which indicates that a different Modulation and Coding Scheme (MCS) corresponds to a different power offset, and if $K_s=0$, then $\Delta_{TF,c}(i)=0$, which indicates that the function to adjust power with the MCS is disabled, where Ks is higher-layer configured to indicate that whether function to adjust power with the MCS is enabled, the BPRE (Bit Per Resource Element) represents the corresponding number of bits per resource element, and $\beta_{offset}^{PUSCH}$ represents a PUSCH resource offset; f(i) represents a power adjustment value obtained from a PUSCH TPC command, which is either accumulative or the current absolute value, where if the UE is higher-layer configured to enable accumulative power adjustment in the cell c, or the TPC command $\delta_{PUSCH,c}$ of the cell c is included in a PDCCH/EPDCCH in the DCI format 0, where CRC is scrambled by a Temporary Cell-Radio Network Temporary Identifier (TC-RNTI), then $f_c(i)=f_c(i-1)+\delta_{PUSCH,c}(i-K_{PUSCH})$, and if the UE is higher-layer configured not to enable accumulative power adjustment in the cell c, then $f_c(i)=\delta_{PUSCH,c}(i-K_{PUSCH})$, where $\delta_{PUSCH,c}$ represents a UE-specific revision value, also referred to as a TPC command, included in a PDCCH/EPDCCH in the DCI format 0/4, or included in a PDCCH/EPDCCH in the DCI format 3/3A, and encoded jointly with other TPC commands, and at this time a CRC check bit of the PDCCH/EPDCCH is scrambled by a TPC-PUSCH-RNTI; and the other parameters are the same as defined above; and For an SRS, transmit power thereof $P_{SRS,c}(i)$ in a subframe i is determined in Equation 4 of:

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\}$$ Equation 4;

Where $M_{SRS,c}$ represents an SRS transmission bandwidth in the subframe i in the cell c as the number of RBs; and the other parameters are the same as defined above.

In an implementation, in the first approach 1, the UE determines the PL corresponding to the one uplink carrier based upon the pre-configured or pre-defined reference carrier particularly as follows:

The UE obtains a reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

Particularly PLc=referenceSignalPower−higher layer filtered RSRP, where referenceSignalPower represents the reference signal power corresponding to the reference carrier, the RSRP represents the reference signal received power, and the higher layer filtered RSRP represents higher-layered filtered RSRP obtained by higher-layer filtering the reference signal received power according to a higher-layer filter coefficient (the higher-layer filter equation can be $F_n=(1-a)\cdot F_{n-1}+a\cdot M_n$, where $M_n$ represents measured RSRP, $F_n$ represents a filtering result, $F_{n-1}$ represents a last filtering result, where $F_0$ represents an initial measurement result received from the physical layer, i.e., initially measured RSRP, $a=\frac{1}{2}^{(k/4)}$, and k represents the higher-layer filter coefficient).

As a second approach, the UE determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel;

Here for each type of uplink channel carrying the uplink information, the UE is configured with k sets of power control parameters for calculating transmit power of that type of uplink channel, where k represents the number of eNBs serving the UE.

In the second approach, each set of power control parameters are used for calculating transmit power of the uplink information corresponding to one of the k different eNBs. This approach is well applicable to an application scenario in which the uplink information is uplink control information, that is, for each type of one uplink channel carrying the uplink information (a PUCCH or a PUSCH), the UE is configured with k sets of power control parameters for calculating transmit power of a PUCCH, and the UE is configured with k sets of power control parameters for calculating transmit power of a PUSCH.

In the second approach, if the uplink information corresponding to the plurality of eNBs needs to be transmitted in the same one uplink channel over the one uplink carrier, then the transmit power will be determined using all the k sets of pre-configured power control parameters corresponding to the one uplink channel.

Furthermore in an implementation, in the second approach, the UE can determine the transmit power of the one uplink channel in any one of the following schemes:

In a scheme B1, the UE determines a PL corresponding to the one uplink carrier based upon a pre-configured or pre-defined reference carrier; determines k target transmit powers respectively according to the k sets of pre-configured power control parameters, and the PL; and takes the largest one or the average of the k target transmit powers as the transmit power of the one uplink channel.

In an implementation, in the scheme B1, the UE determines the PL corresponding to the one uplink carrier based upon the pre-configured or pre-defined reference carrier particularly as follows:

The UE obtains reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

In a scheme B2, the UE determines k PLs corresponding to the one uplink carrier respectively based upon a pre-configured or pre-defined reference carrier, where each PL corresponds to one of the k sets of pre-configured power control parameters; and the UE determines k target transmit powers respectively according to the k sets of pre-configured power control parameters, and the k PLs respectively corresponding to the k sets of pre-configured power control parameters; and takes the largest one or the average of the k target transmit powers as the transmit power of the one uplink channel.

In an implementation, in the scheme B2, the UE determines the k PLs corresponding to the one uplink carrier based upon the pre-configured or pre-defined reference carrier particularly as follows:

The UE obtains k reference signal received powers according to downlink data transmitted over the reference carrier respectively by the k different eNBs serving the UE, and determines the k PLs corresponding to the one uplink carrier respectively according to the k reference signal received powers, a pre-configured higher-layer filter parameter, and a reference signal power corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, k pre-configured higher-layer filter parameters, and a reference signal power corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, a pre-configured higher-layer filter parameter, and k reference signal powers corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, k pre-configured higher-layer filter parameters, and k reference signal powers corresponding to the reference carrier.

As a third approach, the UE determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel;

Here for each type of uplink channel carrying the uplink information, the UE is configured with two sets of power control parameters for calculating transmit power of that type of uplink channel.

In the third approach, one of the sets of power control parameters are used for calculating the transmit power of the uplink information corresponding to the first eNB, and the other set of power control parameters are used for calculating the transmit power of the uplink information corresponding to the second eNB; and this approach is well applicable to an application scenario in which the uplink information is uplink control information, that is, for each type of one uplink channel carrying the uplink information (a PUCCH or a PUSCH), the UE is configured with two sets of power control parameters for calculating transmit power of a PUCCH, and the UE is configured with two sets of power control parameters for calculating transmit power of a PUSCH.

In the third approach, if the uplink information corresponding to the first eNB and the second eNB is transmitted in the same one uplink channel over the one uplink carrier, then the transmit power will be determined using both the two sets of pre-configured power control parameters corresponding to the one uplink channel.

Furthermore in an implementation, in the third approach, the UE can determine the transmit power of the one uplink channel in any one of the following schemes:

In a scheme C1, the UE determines a PL corresponding to the one uplink carrier based upon a pre-configured or pre-defined reference carrier; determines first target transmit power according to a first one of the two sets of pre-configured power control parameters, and the PL, and determines second target transmit power according to a second one of the two sets of pre-configured power control parameters, and the PL; and takes the larger one or the average of the determined two target transmit powers as the transmit power of the one uplink channel.

In an implementation, in the scheme C1, the UE determines the PL corresponding to the one uplink carrier based upon the pre-configured or pre-defined reference carrier particularly as follows:

The UE obtains a reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

In a scheme C2, the UE determines a first PL and a second PL corresponding to the one uplink carrier respectively based upon a pre-configured or pre-defined reference carrier, where the first PL corresponds to a first one of the two sets of pre-configured power control parameters, and the second PL corresponds to a second one of the two sets of pre-configured power control parameters; determines first target transmit power according to the first one of the two sets of pre-configured power control parameters, and the first PL, and determines second target transmit power according to the second one of the two sets of pre-configured power control parameters, and the second PL; and takes the larger one or the average of the determined two target transmit powers as the transmit power of the one uplink channel.

In an implementation, in the scheme C2, the UE determines the first PL and the second PL corresponding to the one uplink carrier based upon the pre-configured or pre-defined reference carrier particularly as follows:

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a pre-configured higher-layer filter parameter, and a reference signal power corresponding to the reference carrier, and determines the second PL according to the second reference signal received power, the pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a first pre-configured higher-layer filter parameter, and a reference signal power corresponding to the reference carrier, and determines the second PL according to the second reference signal received power, a second pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a pre-configured higher-layer filter parameter, and a first reference signal power corresponding to the reference carrier, and determines the second PL according to the second reference signal received power, the pre-configured higher-layer filter parameter, and a second reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a first pre-configured higher-layer filter parameter, and a first reference signal power corresponding to the reference carrier, and determines the second PL according to the second reference signal received power, a second pre-configured higher-layer filter parameter, and a second reference signal power corresponding to the reference carrier.

As a fourth approach, the UE determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel;

Here for each type of uplink channel carrying the uplink information, the UE is configured with only one set of power control parameters for calculating transmit power of that type of uplink channel.

The fourth approach can be applicable to a scenario in which the uplink information is uplink control information (first uplink control information or second uplink control information), uplink data carried in a PUSCH, and an SRS, that is, for each type of one uplink channel carrying the uplink information (a PUCCH or a PUSCH or an SRS), the UE is configured with only one set of power control parameters for calculating transmit power of a PUCCH, the UE is configured with only one set of power control parameters for calculating transmit power of a PUSCH, and the UE is configured with only one set of power control parameters for calculating transmit power of an SRS. If the uplink information is uplink control information, then the uplink channel carrying the first uplink control information, and the uplink channel carrying the second uplink control information can be the same type of channel, for example, both of them are PUCCHs or PUSCHs, or they can be different types of channels, for example, one of them is a PUCCH, and the other is a PUSCH.

In the fourth approach, if the uplink information corresponding to the different eNBs is transmitted respectively in the different uplink channels over the one uplink carrier, then the transmit power will be determined for each of the different uplink channels using the one set of power control parameters corresponding to that type of uplink channel;

For example, if the UE needs to transmit a first PUCCH carrying the first uplink control information corresponding to the first type of carrier scheduled by the first eNB, and a second PUCCH carrying the second uplink control information corresponding to the second type of carrier scheduled by the second eNB, concurrently over the one uplink carrier, then the transmit power will be determined for both the first PUCCH and the second PUCCH using the same set of power control parameters for calculating the transmit power of the PUCCH;

In another example, if the UE needs to transmit a first PUSCH scheduled by the first eNB (or a first PUSCH carrying the first uplink control information corresponding to the first type of carrier scheduled by the first eNB), and a second PUSCH scheduled by the second eNB (or a second PUSCH carrying the second uplink control information corresponding to the second type of carrier scheduled by the second eNB), concurrently over the one uplink carrier, then the transmit power will be determined for both the first PUSCH and the second PUSCH using the same set of power control parameters for calculating the transmit power of the PUSCH; and In still another example, if the UE needs to transmit a first SRS corresponding to the first eNB, and a second SRS corresponding to the second eNB, concurrently over the one uplink carrier, then the transmit power will be determined for both the first SRS and the second SRS H using the same set of power control parameters for calculating the transmit power of the SRS.

Furthermore in the fourth approach, the UE determines the transmit power of the first uplink channel carrying the uplink information corresponding to the first eNB, and the transmit power of the second uplink channel carrying the uplink information corresponding to the second eNB respectively according to the one set of pre-configured power control parameters for calculating transmit power of an uplink channel carrying the uplink information particularly in the following preferred schemes:

In a scheme D1, the UE determines a PL corresponding to the one uplink carrier based upon a pre-configured or pre-defined reference carrier; the UE determines target transmit power according to the one set of pre-configured power control parameters, and the PL; and the UE takes the determined target transmit power as the transmit power of the first uplink channel, and the transmit power of the second uplink channel;

In the scheme D1, the first uplink channel, and the second uplink channel operate at the same transmit power, i.e., the target transmit power determined by the UE.

In an implementation, in the scheme D1, the UE determines the PL corresponding to the one uplink carrier based upon the pre-configured or pre-defined reference carrier particularly as follows:

The UE obtains a reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

In a scheme D2, the UE determines a first PL and a second PL corresponding to the one uplink carrier respectively based upon the pre-configured or pre-defined reference carrier; and the UE determines the transmit power of the first uplink channel according to the one set of pre-configured power control parameters, and the first PL corresponding to the one uplink carrier, and determines the transmit power of the second uplink channel according to the one set of pre-configured power control parameters, and the second PL corresponding to the one uplink carrier.

In an implementation, in the scheme D2, the UE determines the first PL and the second PL corresponding to the one uplink carrier based upon the pre-configured or pre-defined reference carrier particularly as follows:

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a pre-configured higher-layer filter parameter, and a reference signal power corresponding to the reference carrier, and determines the second PL according to the second reference signal received power, the pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a first pre-configured higher-layer filter parameter, and a reference signal power corresponding to the reference carrier, and determines the second PL according to the second reference signal received power, a second pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the first eNB over the reference carrier; and the UE determines the first PL according to the first reference signal received power, a pre-configured higher-layer filter parameter, and a first reference signal power corresponding to the reference carrier, and determines the second PL according to the second reference signal received power, the pre-configured higher-layer filter parameter, and a second reference signal power corresponding to the reference carrier;

Or

The UE obtains a first reference signal received power according to downlink data transmitted by the first eNB over the reference carrier, and obtains a second reference signal received power according to downlink data transmitted by the first eNB over the reference carrier; and the UE determines the first PL according to the first reference signal received power, a first pre-configured higher-layer filter parameter, and a first reference signal power corresponding to the reference carrier, and determines the second PL according to the second reference signal received power, a second pre-configured higher-layer filter parameter, and a second reference signal power corresponding to the reference carrier.

As a fifth approach, the UE determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, where for each type of uplink channel carrying the uplink information, the UE is configured with k sets of power control parameters for calculating transmit power of that type of uplink channel, where k represents the number of eNBs serving the UE.

In the fifth approach, each set of power control parameters are used for calculating transmit power of the uplink information corresponding to one of the k different eNBs; and this approach can be applicable to an application scenario in which the uplink information is uplink control information, uplink data carried in a PUSCH, and an SRS, that is, for each type of one uplink channel carrying the uplink information (a PUCCH or a PUSCH or an SRS), the UE is configured with k sets of power control parameters for calculating transmit power of a PUCCH, with k sets of power control parameters for calculating transmit power of a PUSCH, and with k sets of power control parameters for calculating transmit power of an SRS. If the uplink information corresponding to the different eNBs is transmitted respectively in the different uplink channels over the one uplink carrier, then the transmit power will be determined for each of the different uplink channels respectively using one of the k sets of pre-configured power control parameters corresponding to that type of uplink channel; and if the uplink information is uplink control information, then the uplink channel carrying the first uplink control information, and the uplink channel carrying the second uplink control information can be the same type of channel, for example, both of them are PUCCHs or PUSCHs, or they can be different types of channels, for example, one of them is a PUCCH, and the other is a PUSCH. Particularly:

1. If the UE needs to transmit a first PUCCH carrying the first uplink control information corresponding to the first type of carrier scheduled by the first eNB, a second PUCCH carrying the second uplink control information corresponding to the second type of carrier scheduled by the second eNB, . . . , and a k-th PUCCH carrying the k-th uplink control information corresponding to the k-th type of carrier scheduled by the k-th eNB, concurrently over the one uplink carrier, then the transmit power will be determined for the first PUCCH, the second PUCCH, . . . , and the k-th PUCCH respectively using a first set of power control parameters, a second set of power control parameters, . . . , and a k-th set of power control parameters for calculating transmit power of a PUCCH.

2. If the UE needs to transmit a first PUSCH scheduled by the first eNB (or a first PUSCH carrying the first uplink control information corresponding to the first type of carrier scheduled by the first eNB), a second PUSCH scheduled by the second eNB (or a second PUSCH carrying the second uplink control information corresponding to the second type of carrier scheduled by the second eNB), . . . , and a k-th PUSCH scheduled by the k-th eNB (a k-th PUSCH carrying the k-th uplink control information corresponding to the k-th type of carrier scheduled by the k-th eNB), concurrently over the one uplink carrier, then the transmit power will be determined for the first PUSCH, the second PUSCH, . . . , and the k-th PUSCH respectively using a first set of power control parameters, a second set of power control parameters, . . . , and a k-th set of power control parameters for calculating transmit power of a PUSCH.

3. If the UE needs to transmit a first SRS corresponding to the first eNB, a second SRS corresponding to the second eNB, . . . , and a k-th SRS corresponding to the k-th eNB, concurrently over the one uplink carrier, then the transmit power will be determined for the first SRS, the second SRS, . . . , and the k-th SRS respectively using a first set of power control parameters, a second set of power control parameters, . . . , and a k-th set of power control parameters for calculating transmit power of an SRS.

Furthermore in the fifth approach, the UE determines the transmit powers of the k uplink channels carrying the uplink information corresponding to the k different eNBs, respectively based upon the pre-configured or pre-defined reference carrier particularly in the following preferred schemes:

In a scheme E1, the UE determines a PL corresponding to the one uplink carrier based upon a pre-configured or pre-defined reference carrier, and determines the transmit powers of the k uplink channels carrying the uplink information corresponding to the k different eNBs, respectively according to the k sets of pre-configured power control parameters, and the PL.

In an implementation, in the scheme E1, the UE determines the PL corresponding to the one uplink carrier based upon the pre-configured or pre-defined reference carrier particularly as follows:

The UE obtains a reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

In a scheme E2, the UE determines k PLs corresponding to the one uplink carrier based upon a pre-configured or pre-defined reference carrier, where each PL corresponds to one of the k sets of pre-configured power control parameters; and the UE determines the transmit powers of the k uplink channels carrying the uplink information corresponding to the k different eNBs, respectively according to the k sets of pre-configured power control parameters, and the k PLs respectively corresponding to the k sets of pre-configured power control parameters.

In an implementation, in the scheme E2, the UE determines the k PLs corresponding to the one uplink carrier based upon the pre-configured or pre-defined reference carrier particularly as follows:

The UE obtains k reference signal received powers according to downlink data transmitted over the reference carrier respectively by the k different eNBs serving the UE, and determines the k PLs corresponding to the one uplink carrier respectively according to the k reference signal received powers, a pre-configured higher-layer filter parameter, and a reference signal power corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, k pre-configured higher-layer filter parameters, and a reference signal power corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, a pre-configured higher-layer filter parameter, and k reference signal powers corresponding to the reference carrier;

Or

The UE obtains k reference signal received powers according to downlink data transmitted over the reference carrier respectively by the k different eNBs serving the UE, and determines the k PLs corresponding to the one uplink carrier respectively according to the k reference signal received powers, k pre-configured higher-layer filter parameters, and k reference signal powers corresponding to the reference carrier.

As a sixth approach, the UE determines transmit power of a first uplink channel carrying the uplink information corresponding to the first eNB, and transmit power of a second uplink channel carrying the uplink information corresponding to the second eNB, respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, where for each type of uplink channel carrying the uplink information, the UE is configured with two sets of power control parameters for calculating transmit power of that type of uplink channel.

In the sixth approach, among the two sets of pre-configured power control parameters, one of the sets of power control parameters are used for calculating the transmit power of the uplink information corresponding to the first eNB, and the other set of power control parameters are used for calculating the transmit power of the uplink information corresponding to the second eNB.

The sixth approach can be applicable to a scenario in which the uplink information is uplink control information, uplink data carried in a PUSCH, and an SRS, that is, for each type of one uplink channel carrying the uplink information (a PUCCH or a PUSCH or an SRS), the UE is configured with two sets of power control parameters for calculating transmit power of a PUCCH, the UE is configured with two sets of power control parameters for calculating transmit power of a PUSCH, and the UE is configured with two sets of power control parameters for calculating transmit power of an SRS. If the uplink information corresponding to the different eNBs is transmitted respectively in the different uplink channels over the one uplink carrier, then the transmit power will be determined for each of the different uplink channels respectively using one of the two sets of pre-configured power control parameters corresponding to that type of uplink channel; and if the uplink information is uplink control information, then the uplink channel carrying the first uplink control information, and the uplink channel carrying the second uplink control information can be the same type of channel, for example, both of them are PUCCHs or PUSCHs, or they can be different types of channels, for example, one of them is a PUCCH, and the other is a PUSCH. Particularly:

1. If the UE needs to transmit a first PUCCH carrying the first uplink control information corresponding to the first type of carrier scheduled by the first eNB, and a second PUCCH carrying the second uplink control information corresponding to the second type of carrier scheduled by the second eNB, concurrently over the one uplink carrier, then the transmit power will be determined for the first PUCCH and the second PUCCH respectively using a first set of power control parameters and a second set of power control parameters for calculating transmit power of a PUCCH.

2. If the UE needs to transmit a first PUSCH scheduled by the first eNB (or a first PUSCH carrying the first uplink control information corresponding to the first type of carrier scheduled by the first eNB), and a second PUSCH scheduled by the second eNB (or a second PUSCH carrying the second uplink control information corresponding to the second type of carrier scheduled by the second eNB), concurrently over the one uplink carrier, then the transmit power will be determined for the first PUSCH and the second PUSCH respectively using a first set of power control parameters and a second set of power control parameters for calculating transmit power of a PUSCH.

3. If the UE needs to transmit a first SRS corresponding to the first eNB, and a second SRS corresponding to the second eNB, concurrently over the one uplink carrier, then the transmit power will be determined for the first SRS and the second SRS respectively using a first set of power control parameters and a second set of power control parameters for calculating transmit power of an SRS.

Furthermore in the sixth approach, the UE can determine the transmit power of the one uplink channel in any one of the following preferred schemes:

In a scheme F1, the UE determines a PL corresponding to the one uplink carrier based upon a pre-configured or pre-defined reference carrier; and the UE determines the transmit power of the first uplink channel according to a first one of the two sets of pre-configured power control parameters, and the PL, and determines the transmit power of the second uplink channel according to a second one of the two sets of pre-configured power control parameters, and the PL.

In an implementation, in the scheme F1, the UE determines the PL corresponding to the one uplink carrier based upon the pre-configured or pre-defined reference carrier particularly as follows:

The UE obtains a reference signal received power according to downlink data transmitted by the first eNB, or the second eNB, or another eNB serving the UE other than the first eNB and the second eNB over the reference carrier, and determines the PL corresponding to the one uplink carrier according to the reference signal received power, a pre-configured higher-layer filter parameter, and a reference signal power corresponding to the reference carrier.

In a scheme F2, the UE determines a first PL and a second PL corresponding to the one uplink carrier respectively based upon a pre-configured or pre-defined reference carrier; and the UE determines the transmit power of the first uplink channel according to a first one of the two sets of pre-configured power control parameters, and the first PL, and determines the transmit power of the second uplink channel according to a second one of the two sets of pre-configured power control parameters, and the second PL.

In an implementation, in the scheme F2, the UE determines the first PL and the second PL corresponding to the one uplink channel based upon the pre-configured or pre-defined reference carrier particularly as follows:

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a pre-configured higher-layer filter parameter, and a reference signal power corresponding to the reference carrier, and determines the second PL according to the second reference signal received power, the pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a first pre-configured higher-layer filter parameter, and a reference signal power corresponding to the reference carrier, and determines the second PL according to the second reference signal received power, a second pre-configured higher-layer filter parameter, and the reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a pre-configured higher-layer filter parameter, and a first reference signal power corresponding to the reference carrier, and determines the second PL according to the second reference signal received power, the pre-configured higher-layer filter parameter, and a second reference signal power corresponding to the reference carrier;

Or

The UE obtains a first reference signal received power according to downlink data transmitted by the first eNB over the reference carrier, and obtains a second reference signal received power according to downlink data transmitted by the second eNB over the reference carrier; and the UE determines the first PL according to the first reference signal received power, a first pre-configured higher-layer filter parameter, and a first reference signal power corresponding to the reference carrier, and determines the second PL according to the second reference signal received power, a second pre-configured higher-layer filter parameter, and a second reference signal power corresponding to the reference carrier.

In an embodiment of the invention, the reference carrier in the first approach to the sixth approach above is particularly:

A downlink primary carrier of the UE; or a downlink carrier in a pairing relationship with the one uplink carrier; or a downlink carrier pre-configured in higher-layer signaling.

It shall be noted that the pairing relationship refers to a pairing relationship between the downlink carrier and the uplink carrier, pre-configured in a System Information Block (SIB), where one uplink carrier corresponds to one downlink carrier in the pairing relationship.

In an embodiment of the invention, for the first approach to the sixth approach, the at least one set of pre-configured power control parameters are configured particularly as follows:

The one set of pre-configured power control parameters are configured particularly as follows:

The UE is pre-configured with the one set of power control parameters by the first eNB or the second eNB or any other eNB serving the UE other than the first and second eNBs;

and preferably if the first eNB is a master eNB, then the UE will be configured therewith by the first eNB.

The k sets of pre-configured power control parameters are configured particularly in the following two configuration schemes:

In a first configuration scheme, the k sets of power control parameters are pre-configured to the UE by the first eNB or the second eNB or any other eNB serving the UE other than the first and second eNBs, and notified to the other eNBs;

Preferably if the first eNB is a master eNB, then the first eNB will configure the UE with the k sets of power control parameters by the first eNB, and notify the other different eNBs of the respective sets of power control parameters corresponding to the respective eNBs.

In a second configuration scheme, the UE is pre-configured with the k sets of power control parameters respectively by the k different eNBs serving the UE.

The two sets of pre-configured power control parameters are configured particularly in the following two configuration schemes:

In a first configuration scheme, the two sets of power control parameters are pre-configured to the UE by the first eNB or the second eNB or any other eNB serving the UE other than the first and second eNBs, and notified to the other eNBs; and preferably if the first eNB is a master eNB, then the first eNB will configure the UE with the two sets of power control parameters, and notify the other different eNBs of the sets of power control parameters corresponding to the respective eNBs.

In a second configuration scheme, the UE is pre-configured with the two sets of power control parameters respectively by the first eNB and the second eNB serving the UE.

The power adjustment value of the at least one uplink channel carrying the uplink information corresponding to the first eNB, and the uplink information corresponding to the second eNB will be determined in an embodiment of the invention as described below.

In the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the method according to the embodiment of the invention will further include:

The UE determines the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or The UE determines the power adjustment value corresponding to the one uplink channel by accumulating only TPC commands corresponding to the one uplink channel, carried in PDCCHs or EPDCCHs transmitted by the second eNB; or The UE determines the power adjustment value corresponding to the one uplink channel by accumulating TPC commands corresponding to the one uplink channel, carried in PDCCHs transmitted by the first eNB and the second eNB; or The UE determines the power adjustment value corresponding to the one uplink channel by accumulating TPC commands corresponding to the one uplink channel, carried in EPDCCHs transmitted by the first eNB and the second eNB.

The power adjustment value of the one uplink channel carrying the uplink information corresponding to the first eNB, and the uplink information corresponding to the second eNB will be determined in the first approach or the third approach as exemplified below:

1. If the one uplink channel is a PUCCH, and the power adjustment value corresponding to the PUCCH is determined in an accumulative manner, then:

The UE determines the power adjustment value corresponding to the one PUCCH by accumulating only PUCCH TPC commands carried in PDCCHs or EPDCCHs transmitted by the first eNB; or the UE determines the power adjustment value corresponding to the one PUCCH by accumulating only PUCCH TPC commands carried in PDCCHs or EPDCCHs transmitted by the second eNB; or the UE determines the power adjustment value corresponding to the one PUCCH by accumulating PUCCH TPC commands carried in PDCCHs transmitted by the first eNB and the second eNB; or the UE determines the power adjustment value corresponding to the one PUCCH by accumulating PUCCH TPC commands carried in EPDCCHs transmitted by the first eNB and the second eNB.

2. If the one uplink channel is a PUSCH, and the power adjustment value corresponding to the PUSCH is determined in an accumulative manner, then:

The UE determines the power adjustment value corresponding to the one PUSCH by accumulating only PUSCH TPC commands carried in PDCCHs or EPDCCHs transmitted by the first eNB; or the UE determines the power adjustment value corresponding to the one PUSCH by accumulating only PUSCH TPC commands carried in PDCCHs or EPDCCHs transmitted by the second eNB; or the UE determines the power adjustment value corresponding to the one PUSCH by accumulating PUSCH TPC commands carried in PDCCHs transmitted by the first eNB and the second eNB; or the UE determines the power adjustment value corresponding to the one PUSCH by accumulating PUSCH TPC commands carried in EPDCCHs transmitted by the first eNB and the second eNB.

In the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the method according to the embodiment of the invention will further include:

The UE determines the power adjustment value corresponding to the one uplink channel by accumulating only TPC commands corresponding to the one uplink channel, carried in PDCCHs or EPDCCHs transmitted by the first eNB; or The UE determines the power adjustment value corresponding to the one uplink channel by accumulating only TPC commands corresponding to the one uplink channel, carried in PDCCHs or EPDCCHs transmitted by the second eNB; or The UE determines the power adjustment value corresponding to the one uplink channel by accumulating only TPC commands corresponding to the one uplink channel, carried in PDCCHs or EPDCCHs transmitted by predefined one of the k different eNBs; or The UE determines the power adjustment value corresponding to the one uplink channel by accumulating TPC commands corresponding to the one uplink channel, carried in PDCCHs transmitted by the first eNB and the second eNB; or The UE determines the power adjustment value corresponding to the one uplink channel by accumulating TPC commands corresponding to the one uplink channel, carried in EPDCCHs transmitted by the first eNB and the second eNB; or The UE determines the power adjustment value corresponding to the one uplink channel by accumulating TPC commands corresponding to the one uplink channel, carried in PDCCHs transmitted by the k different eNBs; or The UE determines the power adjustment value corresponding to the one uplink channel by accumulating TPC commands corresponding to the one uplink channel, carried in EPDCCHs transmitted by the k different eNBs.

It shall be noted that the PDCCH or the EPDCCH can be a PDCCH or an EPDCCH carrying a DL grant, or a PDCCH or an EPDCCH instructing a downlink Semi-Persistent Scheduling (SPS) resource to be released, or a PDCCH or an EPDCCH in the Downlink Control Information (DCI) format 3/3A and scrambled by a TPC-PUCCH-Radio Network Temporary Identifier (RNTI) (i.e., a PDCCH or an EPDCCH transmitting PUCCH TPC commands group-cast by a plurality of UEs, in a common search space).

The power adjustment value of the one uplink channel carrying the uplink information corresponding to the first eNB, and the uplink information corresponding to the second eNB will be determined in the second approach as exemplified below:

1. If the one uplink channel is a PUCCH, and the power adjustment value corresponding to the PUCCH is determined in an accumulative manner, then:

The UE determines the power adjustment value corresponding to the one PUCCH by accumulating only PUCCH TPC commands carried in PDCCHs or EPDCCHs transmitted by the first eNB; or the UE determines the power adjustment value corresponding to the one PUCCH by accumulating only PUCCH TPC commands carried in PDCCHs or EPDCCHs transmitted by the second eNB; or the UE determines the power adjustment value corresponding to the one PUCCH by accumulating only PUCCH TPC commands carried in PDCCHs or EPDCCHs transmitted by predefined one of the k different eNBs; or the UE determines the power adjustment value corresponding to the one PUCCH by accumulating PUCCH TPC commands carried in PDCCHs transmitted by the first eNB and the second eNB; or the UE determines the power adjustment value corresponding to the one PUCCH by accumulating PUCCH TPC commands carried in EPDCCHs transmitted by the first eNB and the second eNB; or the UE determines the power adjustment value corresponding to the one PUCCH by accumulating PUCCH TPC commands carried in PDCCHs transmitted by the k different eNBs; or the UE determines the power adjustment value corresponding to the one PUCCH by accumulating PUCCH TPC commands carried in EPDCCHs transmitted by the k different eNBs.

2. If the one uplink channel is a PUSCH, and the power adjustment value corresponding to the PUSCH is determined in an accumulative manner, then:

The UE determines the power adjustment value corresponding to the one PUSCH by accumulating only PUSCH TPC commands carried in PDCCHs or EPDCCHs transmitted by the first eNB; or the UE determines the power adjustment value corresponding to the one PUSCH by accumulating only PUSCH TPC commands carried in PDCCHs or EPDCCHs transmitted by the second eNB; or the UE determines the power adjustment value corresponding to the one PUSCH by accumulating only PUSCH TPC commands carried in PDCCHs or EPDCCHs transmitted by predefined one of the k different eNBs; or the UE determines the power adjustment value corresponding to the one PUSCH by accumulating PUSCH TPC commands carried in PDCCHs transmitted by the first eNB and the second eNB; or the UE determines the power adjustment value corresponding to the one PUSCH by accumulating PUSCH TPC commands carried in EPDCCHs transmitted by the first eNB and the second eNB; or the UE determines the power adjustment value corresponding to the one PUSCH by accumulating PUSCH TPC commands carried in PDCCHs transmitted by the k different eNBs; or the UE determines the power adjustment value corresponding to the one PUSCH by accumulating PUSCH TPC commands carried in EPDCCHs transmitted by the k different eNBs.

For the fourth approach or the sixth approach:

If a power adjustment value obtained from a TPC command, corresponding to the first uplink channel is determined in an accumulative manner, and the power adjustment value is used for calculating the transmit power of the first uplink channel, then the method according to the embodiment of the invention further includes: the UE determines the power adjustment value corresponding to the first uplink channel by accumulating only TPC commands corresponding to the first uplink channel, carried in PDCCHs or EPDCCHs transmitted by the first eNB.

If the power adjustment value corresponding to the second uplink channel is determined in an accumulative manner, and the power adjustment value is used for calculating the transmit power of the second uplink channel, then the method according to the embodiment of the invention further includes: the UE determines the power adjustment value corresponding to the second uplink channel by accumulating only TPC commands corresponding to the second uplink channel, carried in PDCCHs or EPDCCHs transmitted by the second eNB.

The power adjustment values of the first uplink channel and the second uplink channel will be determined in the fourth approach or the sixth approach as exemplified below:

1. If the first uplink channel is a PUCCH, and the power adjustment value corresponding to the PUCCH is determined in an accumulative manner, and the second uplink channel is a PUCCH, and the power adjustment value corresponding to the PUCCH is determined in an accumulative manner, then:

The UE determines the power adjustment value corresponding to the first uplink channel by accumulating only PUCCH TPC commands carried in PDCCHs or EPDCCHs transmitted by the first eNB; and the UE determines the power adjustment value corresponding to the second uplink channel by accumulating only PUCCH TPC commands carried in PDCCHs or EPDCCHs transmitted by the second eNB.

2. If the first uplink channel is a PUSCH, and the power adjustment value corresponding to the PUSCH is determined in an accumulative manner, and the second uplink channel is a PUSCH, and the power adjustment value corresponding to the PUSCH is determined in an accumulative manner, then:

The UE determines the power adjustment value corresponding to the first uplink channel by accumulating only PUSCH TPC commands carried in PDCCHs or EPDCCHs transmitted by the first eNB; and the UE determines the power adjustment value corresponding to the second uplink channel by accumulating only PUSCH TPC commands carried in PDCCHs or EPDCCHs transmitted by the second eNB.

3. If the first uplink channel is a PUCCH, and the power adjustment value corresponding to the PUCCH is determined in an accumulative manner, and the second uplink channel is a PUSCH, and the power adjustment value corresponding to the PUSCH is determined in an accumulative manner, then:

The UE determines the power adjustment value corresponding to the first uplink channel by accumulating only PUCCH TPC commands carried in PDCCHs or EPDCCHs transmitted by the first eNB; and the UE determines the power adjustment value corresponding to the second uplink channel by accumulating only PUSCH TPC commands carried in PDCCHs or EPDCCHs transmitted by the second eNB.

4. If the first uplink channel is a PUSCH, and the power adjustment value corresponding to the PUSCH is determined in an accumulative manner, and the second uplink channel is a PUCCH, and the power adjustment value corresponding to the PUCCH is determined in an accumulative manner, then:

The UE determines the power adjustment value corresponding to the first uplink channel by accumulating only PUSCH TPC commands carried in PDCCHs or EPDCCHs transmitted by the first eNB; and the UE determines the power adjustment value corresponding to the second uplink channel by accumulating only PUCCH TPC commands carried in PDCCHs or EPDCCHs transmitted by the second eNB.

For the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the method according to the embodiment of the invention further includes:

The UE determines the power adjustment value corresponding to the k-th uplink channel by accumulating only TPC commands corresponding to the k-th uplink channel, carried in PDCCHs or EPDCCHs transmitted by the k-th eNB.

The power adjustment value of the k-th uplink channel carrying the uplink information corresponding to the k-th eNB will be determined in the fifth approach as exemplified below:

1. If the k-th uplink channel is a PUCCH, and the power adjustment value corresponding to the PUCCH is determined in an accumulative manner, then the UE will determine the power adjustment value of the k-th uplink channel by accumulating only PUCCH TPC commands carried in PDCCHs or EPDCCHs transmitted by the k-th eNB; and 2. If the k-th uplink channel is a PUSCH, and the power adjustment value corresponding to the PSCCH is determined in an accumulative manner, then the UE will determine the power adjustment value of the k-th uplink channel by accumulating only PUSCH TPC commands carried in PDCCHs or EPDCCHs transmitted by the k-th eNB.

It shall be noted that the PDCCH or the EPDCCH can be:

A PDCCH or an EDCCH carrying a DL grant; or

A PDCCH or an EPDCCH instructing a downlink Semi-Persistent Scheduling (SPS) resource to be released; or A PDCCH or an EPDCCH in the Downlink Control Information (DCI) format 3/3A and scrambled by a TPC-PUCCH-Radio Network Temporary Identifier (RNTI) (i.e., a PDCCH or an EPDCCH transmitting PUCCH TPC commands group-cast by a plurality of UEs, in a common search space).

Preferably the PDCCH or the EPDCCH carrying a PUCCH TPC command can be:

A PDCCH or an EDCCH carrying a DL grant; or

A PDCCH or an EPDCCH instructing a downlink SPS resource to be released; or

A PDCCH or an EPDCCH in the DCI format 3/3A and scrambled by a TPC-PUCCH-RNTI (i.e., a PDCCH or an EPDCCH transmitting PUCCH TPC commands group-cast by a plurality of UEs, in a common search space).

Preferably the PDCCH or the EPDCCH carrying a PUSCH TPC command can be:

A PDCCH or an EDCCH carrying a UL grant; or

A PDCCH or an EPDCCH in the DCI format 3/3A and scrambled by a TPC-PUCCH-RNTI (i.e., a PDCCH or an EPDCCH transmitting PUSCH TPC commands group-cast by a plurality of UEs, in a common search space).

In an embodiment of the invention, for the fourth approach or the sixth approach, if the UE transmits the first uplink control information in the first uplink channel, and transmits the second uplink control information in the second uplink channel, respectively in the same uplink subframe of the one uplink carrier, then such a case may occur that current total transmit power in the uplink subframe exceeds maximum transmit power of the one uplink carrier, or maximum transmit power of the UE, and preferably in this case, the method according to the embodiment of the invention further includes:

The UE scales the power of the first uplink channel and/or the second uplink channel so that the current total transmit power in the uplink subframe does not exceed either the maximum transmit power of the one uplink carrier, or the maximum transmit power of the UE.

Particularly there are the following two preferred schemes:

In a first scheme, the UE scales the power of the first uplink channel and the second uplink channel at the same proportion so that the current total transmit power in the uplink subframe does not exceed either the maximum transmit power of the one uplink carrier, or the maximum transmit power of the UE.

Particularly if the current total transmit power in the uplink subframe exceeds the maximum transmit power of the one uplink carrier, or the maximum transmit power of the UE, then the UE will scale the power of the first uplink channel and the second uplink channel at the same proportion.

In a second scheme, the UE scales the power of the first uplink channel and/or the second uplink channel according to pre-defined priorities so that the current total transmit power in the uplink subframe does not exceed either the maximum transmit power of the one uplink carrier, or the maximum transmit power of the UE.

Particularly the UE preferentially scales the power of the priority-lower one of the first uplink channel and the second uplink channel according to the pre-defined priorities; or the UE preferentially scales the power of the priority-higher one of the first uplink channel and the second uplink channel according to the pre-defined priorities.

Preferably the pre-defined priorities include but will not be limited to at least one of the following priorities:

1. The priority of a PUCCH is higher than the priority of a PUSCH, the priority of a PUSCH is higher than the priority of an SRS, and the priority of an uplink channel carrying uplink control information is higher than the priority of an uplink channel carrying no uplink channel information;

In this scheme, preferably if a plurality of PUCCHs are transmitted concurrently, then the priority of a first PUCCH carrying the uplink control information corresponding to the first type of carrier scheduled by the first eNB is higher than the priority of a first PUCCH carrying the uplink control information corresponding to the first type of carrier scheduled by the first eNB.

2. The priority of a PUCCH carrying uplink control information corresponding to a primary carrier is higher than the priorities of other PUCCHs.

In this scheme, preferably if a plurality of PUSCHs carrying uplink control information are transmitted concurrently, then the priority of a first PUSCH carrying the uplink control information corresponding to the first type of carrier scheduled by the first eNB is higher than the priority of a first PUSCH carrying the uplink control information corresponding to the first type of carrier scheduled by the first eNB.

3. The priority of a PUSCH carrying uplink control information corresponding to a primary carrier is higher than the priorities of other PUSCHs.

It shall be noted that the pre-defined priorities above can be used in combination.

Similarly in an embodiment of the invention, for the fifth approach, if the UE transmits the k uplink channels carrying the uplink information corresponding to the k different eNBs, in the same uplink subframe of the one uplink carrier, and total transmit power in the uplink subframe exceeds maximum transmit power of the one uplink carrier, or maximum transmit power of the UE, then the method will further include:

The UE scales the power of the k uplink channels at the same proportion so that the current total transmit power in the uplink subframe does not exceed either the maximum transmit power of the one uplink carrier, or the maximum transmit power of the UE; or The UE scales the power of several uplink channels of the k uplink channels according to pre-defined priorities so that the current total transmit power in the uplink subframe does not exceed either the maximum transmit power of the one uplink carrier, or the maximum transmit power of the UE.

The process flows of the methods above can be performed in software program which can be stored in a storage medium, where the steps in the methods above are performed by the stored software program being invoked.

Based upon the same inventive idea, an embodiment of the invention further provides a UE, and since the UE addresses the problem under a similar principle to the method above for control uplink power, reference can be made to the implementation of the method for an implementation of the UE, so a repeated description thereof will be omitted here.

Figure 5:
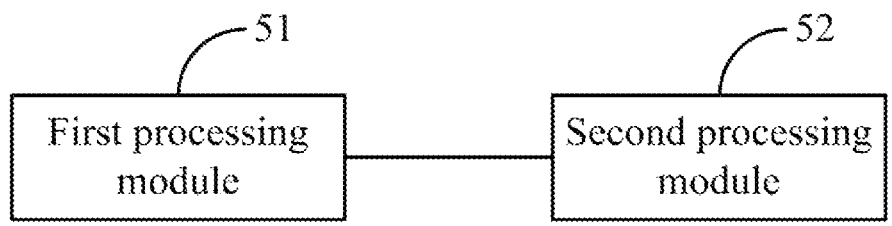
FIG. 5 illustrates a schematic diagram of a first UE according to an embodiment of the invention.

Referring to FIG. 5, an embodiment of the invention provides a UE applicable to a dual connectivity scenario, the UE including:

A first processing module 51 configured to determine uplink information to be transmitted over one uplink carrier, where the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and A second processing module 52 configured to determine transmit power of at least one uplink channel carrying the uplink information, according to at least one set of pre-configured power control parameters for calculating transmit power of an uplink channel carrying the uplink information, and to transmit the corresponding uplink information in the at least one uplink channel over the one uplink carrier at the transmit power of the at least one uplink channel.

In the embodiment of the invention, the UE can transmit the uplink information scheduled by the different eNBs, over the one uplink carrier by transmitting the corresponding uplink information at more reasonable transmit power to thereby avoid being limited in power so as to improve the utilization ratio of power and the transmission efficiency.

In an implementation, the second processing module 52 particularly performs one of the following approaches:

As a first approach, the second processing module determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, where for each type of uplink channel carrying the uplink information, the UE is configured with only one set of power control parameters for calculating transmit power of that type of uplink channel; or As a second approach, the second processing module determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel, where for each type of uplink channel carrying the uplink information, the UE is configured with k sets of power control parameters for calculating transmit power of that type of uplink channel, where k represents the number of eNBs serving the UE; or As a third approach, the second processing module determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, where for each type of uplink channel carrying the uplink information, the UE is configured with two sets of power control parameters for calculating transmit power of that type of uplink channel; or As a fourth approach, the second processing module determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, where for each type of uplink channel carrying the uplink information, the UE is configured with only one set of power control parameters for calculating transmit power of that type of uplink channel; or As a fifth approach, the second processing module determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, where for each type of uplink channel carrying the uplink information, the UE is configured with k sets of power control parameters for calculating transmit power of that type of uplink channel, where k represents the number of eNBs serving the UE; or As a sixth approach, the second processing module determines transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, where for each type of uplink channel carrying the uplink information, the UE is configured with two sets of power control parameters for calculating transmit power of that type of uplink channel.

In an implementation, for the first approach, the second processing module 52 configured to determine the transmit power of the one uplink channel carrying the uplink information corresponding to the first eNB, and the uplink information corresponding to the second eNB concurrently, according to the one set of pre-configured power control parameters is configured:

To determine a Path Loss (PL) corresponding to the one uplink carrier based upon a pre-configured or pre-defined reference carrier, and to determine the transmit power of the one uplink channel according to the one set of pre-configured power control parameters, and the PL.

In an implementation, for the second approach, the second processing module 52 configured to determine the transmit power of the one uplink channel carrying the uplink information corresponding to the k different eNBs concurrently, according to the k sets of pre-configured power control parameters is configured:

To determine a PL corresponding to the one uplink carrier based upon a pre-configured or pre-defined reference carrier; to determine k target transmit powers respectively according to the k sets of pre-configured power control parameters, and the PL; and to take the largest one or the average of the k target transmit powers as the transmit power of the one uplink channel; or To determine k PLs corresponding to the one uplink carrier respectively based upon a pre-configured or pre-defined reference carrier, where each PL corresponds to one of the k sets of pre-configured power control parameters; to determine k target transmit powers respectively according to the k sets of pre-configured power control parameters, and the k PLs respectively corresponding to the k sets of pre-configured power control parameters; and to take the largest one or the average of the k target transmit powers as the transmit power of the one uplink channel.

In an implementation, for the third approach, the second processing module 52 configured to determine the transmit power of the one uplink channel carrying the uplink information corresponding to the first eNB, and the uplink information corresponding to the second eNB concurrently, according to the two sets of pre-configured power control parameters is configured:

To determine a PL corresponding to the one uplink carrier based upon a pre-configured or pre-defined reference carrier; to determine first target transmit power according to a first one of the two sets of pre-configured power control parameters, and the PL, and to determine second target transmit power according to a second one of the two sets of pre-configured power control parameters, and the PL; and to take the larger one or the average of the determined two target transmit powers as the transmit power of the one uplink channel; or To determine a first PL and a second PL corresponding to the one uplink carrier respectively based upon a pre-configured or pre-defined reference carrier, where the first PL corresponds to a first one of the two sets of pre-configured power control parameters, and the second PL corresponds to a second one of the two sets of pre-configured power control parameters; to determine first target transmit power according to the first one of the two sets of pre-configured power control parameters, and the first PL, and to determine second target transmit power according to the second one of the two sets of pre-configured power control parameters, and the second PL; and to take the larger one or the average of the determined two target transmit powers as the transmit power of the one uplink channel.

In an implementation, for the fourth approach, the second processing module 52 configured to determine the transmit power of the first uplink channel carrying the uplink information corresponding to the first eNB, and the transmit power of the second uplink channel carrying the uplink information corresponding to the second eNB, respectively according to the one set of pre-configured power control parameters is configured:

To determine a PL corresponding to the one uplink carrier based upon a pre-configured or pre-defined reference carrier; to determine target transmit power according to the one set of pre-configured power control parameters, and the PL; and to take the determined target transmit power as the transmit power of the first uplink channel, and the transmit power of the second uplink channel;

Or

To determine a first PL and a second PL corresponding to the one uplink carrier respectively based upon the pre-configured or pre-defined reference carrier; and to determine the transmit power of the first uplink channel according to the one set of pre-configured power control parameters, and the first PL corresponding to the one uplink carrier, and to determine the transmit power of the second uplink channel according to the one set of pre-configured power control parameters, and the second PL corresponding to the one uplink carrier.

In an implementation, for the fifth approach, the second processing module 502 configured to determine the transmit powers of the k uplink channels carrying the uplink information corresponding to the k different eNBs, respectively according to the k sets of pre-configured power control parameters is configured:

To determine a PL corresponding to the one uplink carrier based upon a pre-configured or pre-defined reference carrier, and to determine the transmit powers of the k uplink channels carrying the uplink information corresponding to the k different eNBs, respectively according to the k sets of pre-configured power control parameters, and the PL; or To determine k PLs corresponding to the one uplink carrier based upon a pre-configured or pre-defined reference carrier, where each PL corresponds to one of the k sets of pre-configured power control parameters; and to determine the transmit powers of the k uplink channels carrying the uplink information corresponding to the k different eNBs, respectively according to the k sets of pre-configured power control parameters, and the k PLs respectively corresponding to the k sets of pre-configured power control parameters.

In an implementation, for the sixth approach, the second processing module 502 configured to determine the transmit power of the first uplink channel carrying the uplink information corresponding to the first eNB, and the transmit power of the second uplink channel carrying the uplink information corresponding to the second eNB respectively according to the two sets of pre-configured power control parameters is configured:

To determine a PL corresponding to the one uplink carrier based upon a pre-configured or pre-defined reference carrier; and to determine the transmit power of the first uplink channel according to a first one of the two sets of pre-configured power control parameters, and the PL, and to determine the transmit power of the second uplink channel according to a second one of the two sets of pre-configured power control parameters, and the PL; or To determine a first PL and a second PL corresponding to the one uplink carrier respectively based upon a pre-configured or pre-defined reference carrier; and to determine the transmit power of the first uplink channel according to a first one of the two sets of pre-configured power control parameters, and the first PL, and to determine the transmit power of the second uplink channel according to a second one of the two sets of pre-configured power control parameters, and the second PL.

In the first approach to the sixth approach, the second processing module 52 configured to determine the PL corresponding to the one uplink carrier based upon the pre-configured or pre-defined reference carrier is configured:

To obtain a reference signal received power according to downlink data transmitted by the first eNB, or the second eNB, or another eNB serving the UE other than the first eNB and the second eNB over the reference carrier, and to determine the PL corresponding to the one uplink carrier according to the reference signal received power, a pre-configured higher-layer filter parameter, and a reference signal power corresponding to the reference carrier;

Or

The second processing module 52 configured to determine the k PLs corresponding to the one uplink carrier based upon the pre-configured or pre-defined reference carrier is configured:

To obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and k reference signal powers corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and k reference signal powers corresponding to the reference carrier;

Or

The second processing module 52 configured to determine the first PL and the second PL corresponding to the one uplink carrier based upon the pre-configured or pre-defined reference carrier is configured:

To obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a reference signal power corresponding to the reference carrier, and to determine the second PL according to the second reference signal received power, the pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a reference signal power corresponding to the reference carrier, and to determine the second PL according to the second reference signal received power, a second pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a first reference signal power corresponding to the reference carrier, and to determine the second PL according to the second reference signal received power, the pre-configured higher-layer filter parameter, and a second reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a first reference signal power corresponding to the reference carrier, and to determine the second PL according to the second reference signal received power, a second pre-configured higher-layer filter parameter, and a second reference signal power corresponding to the reference carrier.

In an embodiment of the invention, for the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the second processing module 52 is further configured: to determine the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB.

In an embodiment of the invention, for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the second processing module 52 is further configured: to determine the power adjustment value corresponding to the one uplink channel by accumulating only TPC commands corresponding to the one uplink channel, carried in PDCCHs or EPDCCHs transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating only TPC commands corresponding to the one uplink channel, carried in PDCCHs or EPDCCHs transmitted by predefined one of the k different eNBs; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB; or to determine the power adjustment value corresponding to the one uplink channel by accumulating TPC commands corresponding to the one uplink channel, carried in PDCCHs transmitted by the k different eNBs; or to determine the power adjustment value corresponding to the one uplink channel by accumulating TPC commands corresponding to the one uplink channel, carried in EPDCCHs transmitted by the k different eNBs.

In an embodiment of the invention, for the fourth approach or the sixth approach, if a power adjustment value obtained from a TPC command, corresponding to the first uplink channel is determined in an accumulative manner, and the power adjustment value is used for calculating the transmit power of the first uplink channel, then the second processing module 52 is further configured to determine the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the second processing module 52 is further configured to determine the power adjustment value corresponding to the second uplink channel by accumulating only TPC commands corresponding to the second uplink channel, carried in PDCCHs or EPDCCHs transmitted by the second eNB.

In an embodiment of the invention, for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the second processing module 52 is further configured to determine the power adjustment value corresponding to the k-th uplink channel by accumulating only TPC commands corresponding to the k-th uplink channel, carried in PDCCHs or EPDCCHs transmitted by the k-th eNB.

In an embodiment of the invention, for the fourth approach or the sixth approach, if the first uplink control information and the second uplink control information is transmitted in the same uplink subframe of the one uplink carrier, and total transmit power in the uplink subframe exceeds maximum transmit power of the one uplink carrier, or maximum transmit power of the UE, then preferably the second processing module 52 is further configured:

To scale the power of the first uplink channel and the second uplink channel at the same proportion so that the current total transmit power in the uplink subframe does not exceed either the maximum transmit power of the one uplink carrier, or the maximum transmit power of the UE; or To scale the power of the first uplink channel and/or the second uplink channel according to pre-defined priorities so that the current total transmit power in the uplink subframe does not exceed either the maximum transmit power of the one uplink carrier, or the maximum transmit power of the UE.

In an embodiment of the invention, for the fifth approach, if the k uplink channels carrying the uplink information corresponding to the k different eNBs is transmitted in the same uplink subframe of the one uplink carrier, and total transmit power in the uplink subframe exceeds maximum transmit power of the one uplink carrier, or maximum transmit power of the UE, then the second processing module 52 is further configured:

To scale the power of the k uplink channels at the same proportion so that the current total transmit power in the uplink subframe does not exceed either the maximum transmit power of the one uplink carrier, or the maximum transmit power of the UE; or To scale the power of several uplink channels of the k uplink channels according to pre-defined priorities so that the current total transmit power in the uplink subframe does not exceed either the maximum transmit power of the one uplink carrier, or the maximum transmit power of the UE.

A structure of and processing by a UE according to an embodiment of the invention will be described below in connection with a particular hardware structure thereof.

Figure 6:
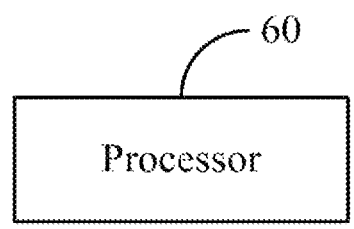
FIG. 6 illustrates a schematic diagram of a second UE according to an embodiment of the invention.

Referring to FIG. 6, further to the embodiment in FIG. 5, the UE includes a transceiver, and at least one processor 61 connected with the transceiver, where:

The processor 61 is configured to determine uplink information to be transmitted over one uplink carrier, where the uplink information includes uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and to determine transmit power of at least one uplink channel carrying the uplink information, according to at least one set of pre-configured power control parameters for calculating transmit power of an uplink channel carrying the uplink information, and to trigger the transceiver to transmit the corresponding uplink information in the at least one uplink channel over the one uplink carrier at the transmit power of the at least one uplink channel.

In an implementation, the processor 61 is configured to particularly perform one of the following approaches:

As a first approach, the processor determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, where for each type of uplink channel carrying the uplink information, the UE is configured with only one set of power control parameters for calculating transmit power of that type of uplink channel; or As a second approach, the processor determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel, where for each type of uplink channel carrying the uplink information, the UE is configured with k sets of power control parameters for calculating transmit power of that type of uplink channel, where k represents the number of eNBs serving the UE; or As a third approach, the processor determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, where for each type of uplink channel carrying the uplink information, the UE is configured with two sets of power control parameters for calculating transmit power of that type of uplink channel; or As a fourth approach, the processor determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, where for each type of uplink channel carrying the uplink information, the UE is configured with only one set of power control parameters for calculating transmit power of that type of uplink channel; or As a fifth approach, the processor determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, where for each type of uplink channel carrying the uplink information, the UE is configured with k sets of power control parameters for calculating transmit power of that type of uplink channel, where k represents the number of eNBs serving the UE; or As a sixth approach, the processor determines transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, where for each type of uplink channel carrying the uplink information, the UE is configured with two sets of power control parameters for calculating transmit power of that type of uplink channel.

In an implementation, for the first approach, the processor 61 configured to determine the transmit power of the one uplink channel carrying the uplink information corresponding to the first eNB, and the uplink information corresponding to the second eNB concurrently, according to the one set of pre-configured power control parameters is configured:

To determine a Path Loss (PL) corresponding to the one uplink carrier based upon a pre-configured or pre-defined reference carrier, and to determine the transmit power of the one uplink channel according to the one set of pre-configured power control parameters, and the PL.

In an implementation, for the second approach, the processor 61 configured to determine the transmit power of the one uplink channel carrying the uplink information corresponding to the k different eNBs concurrently, according to the k sets of pre-configured power control parameters is configured:

To determine a PL corresponding to the one uplink carrier based upon a pre-configured or pre-defined reference carrier; to determine k target transmit powers respectively according to the k sets of pre-configured power control parameters, and the PL; and to take the largest one or the average of the k target transmit powers as the transmit power of the one uplink channel; or To determine k PLs corresponding to the one uplink carrier respectively based upon a pre-configured or pre-defined reference carrier, where each PL corresponds to one of the k sets of pre-configured power control parameters; to determine k target transmit powers respectively according to the k sets of pre-configured power control parameters, and the k PLs respectively corresponding to the k sets of pre-configured power control parameters; and to take the largest one or the average of the k target transmit powers as the transmit power of the one uplink channel.

In an implementation, for the third approach, the processor 61 configured to determine the transmit power of the one uplink channel carrying the uplink information corresponding to the first eNB, and the uplink information corresponding to the second eNB concurrently, according to the two sets of pre-configured power control parameters is configured:

To determine a PL corresponding to the one uplink carrier based upon a pre-configured or pre-defined reference carrier; to determine first target transmit power according to a first one of the two sets of pre-configured power control parameters, and the PL, and to determine second target transmit power according to a second one of the two sets of pre-configured power control parameters, and the PL; and to take the larger one or the average of the determined two target transmit powers as the transmit power of the one uplink channel; or To determine a first PL and a second PL corresponding to the one uplink carrier respectively based upon a pre-configured or pre-defined reference carrier, where the first PL corresponds to a first one of the two sets of pre-configured power control parameters, and the second PL corresponds to a second one of the two sets of pre-configured power control parameters; to determine first target transmit power according to the first one of the two sets of pre-configured power control parameters, and the first PL, and to determine second target transmit power according to the second one of the two sets of pre-configured power control parameters, and the second PL; and to take the larger one or the average of the determined two target transmit powers as the transmit power of the one uplink channel.

In an implementation, for the fourth approach, the processor 61 configured to determine the transmit power of the first uplink channel carrying the uplink information corresponding to the first eNB, and the transmit power of the second uplink channel carrying the uplink information corresponding to the second eNB, respectively according to the one set of pre-configured power control parameters is configured:

To determine a PL corresponding to the one uplink carrier based upon a pre-configured or pre-defined reference carrier; to determine target transmit power according to the one set of pre-configured power control parameters, and the PL; and to take the determined target transmit power as the transmit power of the first uplink channel, and the transmit power of the second uplink channel;

Or

To determine a first PL and a second PL corresponding to the one uplink carrier respectively based upon the pre-configured or pre-defined reference carrier; and to determine the transmit power of the first uplink channel according to the one set of pre-configured power control parameters, and the first PL corresponding to the one uplink carrier, and to determine the transmit power of the second uplink channel according to the one set of pre-configured power control parameters, and the second PL corresponding to the one uplink carrier.

In an implementation, for the fifth approach, the processor 61 configured to determine the transmit powers of the k uplink channels carrying the uplink information corresponding to the k different eNBs, respectively according to the k sets of pre-configured power control parameters is configured:

To determine a PL corresponding to the one uplink carrier based upon a pre-configured or pre-defined reference carrier, and to determine the transmit powers of the k uplink channels carrying the uplink information corresponding to the k different eNBs, respectively according to the k sets of pre-configured power control parameters, and the PL; or To determine k PLs corresponding to the one uplink carrier based upon a pre-configured or pre-defined reference carrier, where each PL corresponds to one of the k sets of pre-configured power control parameters; and to determine the transmit powers of the k uplink channels carrying the uplink information corresponding to the k different eNBs, respectively according to the k sets of pre-configured power control parameters, and the k PLs respectively corresponding to the k sets of pre-configured power control parameters.

In an implementation, for the sixth approach, the processor 61 configured to determine the transmit power of the first uplink channel carrying the uplink information corresponding to the first eNB, and the transmit power of the second uplink channel carrying the uplink information corresponding to the second eNB respectively according to the two sets of pre-configured power control parameters is configured:

To determine a PL corresponding to the one uplink carrier based upon a pre-configured or pre-defined reference carrier; and to determine the transmit power of the first uplink channel according to a first one of the two sets of pre-configured power control parameters, and the PL, and to determine the transmit power of the second uplink channel according to a second one of the two sets of pre-configured power control parameters, and the PL; or To determine a first PL and a second PL corresponding to the one uplink carrier respectively based upon a pre-configured or pre-defined reference carrier; and to determine the transmit power of the first uplink channel according to a first one of the two sets of pre-configured power control parameters, and the first PL, and to determine the transmit power of the second uplink channel according to a second one of the two sets of pre-configured power control parameters, and the second PL.

In the first approach to the sixth approach, the processor 61 configured to determine the PL corresponding to the one uplink carrier based upon the pre-configured or pre-defined reference carrier is configured:

To obtain a reference signal received power according to downlink data transmitted by the first eNB, or the second eNB, or another eNB serving the UE other than the first eNB and the second eNB over the reference carrier, and to determine the PL corresponding to the one uplink carrier according to the reference signal received power, a pre-configured higher-layer filter parameter, and a reference signal power corresponding to the reference carrier;

Or

The processor 61 configured to determine the k PLs corresponding to the one uplink carrier based upon the pre-configured or pre-defined reference carrier is configured:

To obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and k reference signal powers corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and k reference signal powers corresponding to the reference carrier;

Or

The processor 61 configured to determine the first PL and the second PL corresponding to the one uplink carrier based upon the pre-configured or pre-defined reference carrier is configured:

To obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a reference signal power corresponding to the reference carrier, and to determine the second PL according to the second reference signal received power, the pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a reference signal power corresponding to the reference carrier, and to determine the second PL according to the second reference signal received power, a second pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a first reference signal power corresponding to the reference carrier, and to determine the second PL according to the second reference signal received power, the pre-configured higher-layer filter parameter, and a second reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a first reference signal power corresponding to the reference carrier, and to determine the second PL according to the second reference signal received power, a second pre-configured higher-layer filter parameter, and a second reference signal power corresponding to the reference carrier.

In an embodiment of the invention, for the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the processor 61 is further configured: to determine the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB.

In an embodiment of the invention, for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the processor 61 is further configured: to determine the power adjustment value corresponding to the one uplink channel by accumulating only TPC commands corresponding to the one uplink channel, carried in PDCCHs or EPDCCHs transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating only TPC commands corresponding to the one uplink channel, carried in PDCCHs or EPDCCHs transmitted by pre-defined one of the k different eNBs; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB; or to determine the power adjustment value corresponding to the one uplink channel by accumulating TPC commands corresponding to the one uplink channel, carried in PDCCHs transmitted by the k different eNBs; or to determine the power adjustment value corresponding to the one uplink channel by accumulating TPC commands corresponding to the one uplink channel, carried in EPDCCHs transmitted by the k different eNBs.

In an embodiment of the invention, for the fourth approach or the sixth approach, if a power adjustment value obtained from a TPC command, corresponding to the first uplink channel is determined in an accumulative manner, and the power adjustment value is used for calculating the transmit power of the first uplink channel, then the processor 61 is further configured to determine the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the processor 61 is further configured to determine the power adjustment value corresponding to the second uplink channel by accumulating only TPC commands corresponding to the second uplink channel, carried in PDCCHs or EPDCCHs transmitted by the second eNB.

In an embodiment of the invention, for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the processor 61 is further configured to determine the power adjustment value corresponding to the k-th uplink channel by accumulating only TPC commands corresponding to the k-th uplink channel, carried in PDCCHs or EPDCCHs transmitted by the k-th eNB.

In an embodiment of the invention, for the fourth approach or the sixth approach, if the first uplink control information and the second uplink control information is transmitted in the same uplink subframe of the one uplink carrier, and total transmit power in the uplink subframe exceeds maximum transmit power of the one uplink carrier, or maximum transmit power of the UE, then preferably the processor 61 is further configured:

To scale the power of the first uplink channel and the second uplink channel at the same proportion so that the current total transmit power in the uplink subframe does not exceed either the maximum transmit power of the one uplink carrier, or the maximum transmit power of the UE; or To scale the power of the first uplink channel and/or the second uplink channel according to pre-defined priorities so that the current total transmit power in the uplink subframe does not exceed either the maximum transmit power of the one uplink carrier, or the maximum transmit power of the UE.

In an embodiment of the invention, for the fifth approach, if the k uplink channels carrying the uplink information corresponding to the k different eNBs is transmitted in the same uplink subframe of the one uplink carrier, and total transmit power in the uplink subframe exceeds maximum transmit power of the one uplink carrier, or maximum transmit power of the UE, then the processor 61 is further configured:

To scale the power of the k uplink channels at the same proportion so that the current total transmit power in the uplink subframe does not exceed either the maximum transmit power of the one uplink carrier, or the maximum transmit power of the UE; or To scale the power of several uplink channels of the k uplink channels according to pre-defined priorities so that the current total transmit power in the uplink subframe does not exceed either the maximum transmit power of the one uplink carrier, or the maximum transmit power of the UE.

In the embodiments of the invention, the UE can transmit the uplink information scheduled by the different eNBs, over the one uplink carrier by transmitting the corresponding uplink information at more reasonable transmit power to thereby avoid being limited in power so as to improve the utilization ratio of power and the transmission efficiency.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer usable storage mediums (including but not limited to a disk memory, a CD-ROM, an optical memory, etc.) in which computer usable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling uplink power, the method including:

determining, by a UE, uplink information to be transmitted over one uplink carrier, wherein the uplink information comprises uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and determining, by the UE, transmit power of at least one uplink channel carrying the uplink information, according to at least one set of pre-configured power control parameters for calculating transmit power of an uplink channel carrying the uplink information, and transmitting the corresponding uplink information in the at least one uplink channel over the one uplink carrier at the transmit power of the at least one uplink channel;

wherein determining, by the UE, the transmit power of the at least one uplink channel carrying the uplink information, according to the at least one set of pre-configured power control parameters, and transmitting the corresponding uplink information in the at least one uplink channel over the one uplink carrier at the transmit power of the at least one uplink channel comprises:

as a first approach, determining, by the UE, transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmitting the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with only one set of power control parameters for calculating transmit power of that type of uplink channel; or as a second approach, determining, by the UE, transmit power of one uplink channel carrying uplink information corresponding to k different eNBs concurrently, according to k sets of pre-configured power control parameters for calculating transmit power of an uplink channel carrying the uplink information, and transmitting the uplink information corresponding to eNBs for which the uplink information needs to be transmitted in the current uplink subframe, among the k different eNBs in the one uplink channel over the one uplink carrier at the transmit power of the one uplink channel, wherein for each type of uplink channel carrying the uplink information, the UE is configured with k sets of power control parameters for calculating transmit power of that type of uplink channel, wherein k represents the number of eNBs serving the UE; or as a third approach, determining, by the UE, transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmitting the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with two sets of power control parameters for calculating transmit power of that type of uplink channel; or as a fourth approach, determining, by the UE, transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmitting the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with only one set of power control parameters for calculating transmit power of that type of uplink channel; or as a fifth approach, determining, by the UE, transmit powers of k uplink channels carrying uplink information corresponding to k different eNBs, respectively according to k sets of pre-configured power control parameters for calculating transmit power of an uplink channel carrying the uplink information, and transmitting the uplink information corresponding to the k-th eNB in the k-th uplink channel over the one uplink carrier at the transmit power of the k-th uplink channel, wherein for each type of uplink channel carrying the uplink information, the UE is configured with k sets of power control parameters for calculating transmit power of that type of uplink channel, wherein k represents the number of eNBs serving the UE; or as a sixth approach, determining, by the UE, transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmitting the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with two sets of power control parameters for calculating transmit power of that type of uplink channel;

wherein for the first approach, determining, by the UE, the transmit power of the one uplink channel carrying the uplink information corresponding to the first eNB, and the uplink information corresponding to the second eNB concurrently, according to the one set of pre-configured power control parameters comprises:

determining, by the UE, a Path Loss (PL) corresponding to the one uplink carrier based upon a pre-configured or pre-defined reference carrier, and determining the transmit power of the one uplink channel according to the one set of pre-configured power control parameters, and the PL, or for the second approach, determining, by the UE, the transmit power of the one uplink channel carrying the uplink information corresponding to the k different eNBs concurrently, according to the k sets of pre-configured power control parameters comprises:

determining, by the UE, a PL corresponding to the one uplink carrier based upon a pre-configured or pre-defined reference carrier; determining k target transmit powers respectively according to the k sets of pre-configured power control parameters, and the PL; and taking the largest one or the average of the k target transmit powers as the transmit power of the one uplink channel; or determining, by the UE, k PLs corresponding to the one uplink carrier respectively based upon a pre-configured or pre-defined reference carrier, wherein each PL corresponds to one of the k sets of pre-configured power control parameters; determining k target transmit powers respectively according to the k sets of pre-configured power control parameters, and the k PLs respectively corresponding to the k sets of pre-configured power control parameters; and taking the largest one or the average of the k target transmit powers as the transmit power of the one uplink channel, or for the third approach, determining, by the UE, the transmit power of the one uplink channel carrying the uplink information corresponding to the first eNB, and the uplink information corresponding to the second eNB concurrently, according to the two sets of pre-configured power control parameters comprises:

determining, by the UE, a PL corresponding to the one uplink carrier based upon a pre-configured or pre-defined reference carrier; to determine first target transmit power according to a first one of the two sets of pre-configured power control parameters, and the PL, and determining second target transmit power according to a second one of the two sets of pre-configured power control parameters, and the PL; and taking the larger one or the average of the determined two target transmit powers as the transmit power of the one uplink channel; or determining, by the UE, a first PL and a second PL corresponding to the one uplink carrier respectively based upon a pre-configured or pre-defined reference carrier, wherein the first PL corresponds to a first one of the two sets of pre-configured power control parameters, and the second PL corresponds to a second one of the two sets of pre-configured power control parameters; determining first target transmit power according to the first one of the two sets of pre-configured power control parameters, and the first PL, and determining second target transmit power according to the second one of the two sets of pre-configured power control parameters, and the second PL; and taking the larger one or the average of the determined two target transmit powers as the transmit power of the one uplink channel, or for the fourth approach, determining, by the UE, the transmit power of the first uplink channel carrying the uplink information corresponding to the first eNB, and the transmit power of the second uplink channel carrying the uplink information corresponding to the second eNB, respectively according to the one set of pre-configured power control parameters comprises:

determining, by the UE, a PL corresponding to the one uplink carrier based upon a pre-configured or pre-defined reference carrier; determining a target transmit power according to the one set of pre-configured power control parameters, and the PL; and taking the determined target transmit power as the transmit power of the first uplink channel, and the transmit power of the second uplink channel; or determining, by the UE, a first PL and a second PL corresponding to the one uplink carrier respectively based upon the pre-configured or pre-defined reference carrier; and determining the transmit power of the first uplink channel according to the one set of pre-configured power control parameters, and the first PL corresponding to the one uplink carrier, and determining the transmit power of the second uplink channel according to the one set of pre-configured power control parameters, and the second PL corresponding to the one uplink carrier, or for the fifth approach, determining, by the UE, the transmit powers of the k uplink channels carrying the uplink information corresponding to the k different eNBs, respectively according to the k sets of pre-configured power control parameters comprises:

determining, by the UE, a PL corresponding to the one uplink carrier based upon a pre-configured or pre-defined reference carrier, and determining the transmit powers of the k uplink channels carrying the uplink information corresponding to the k different eNBs, respectively according to the k sets of pre-configured power control parameters, and the PL; or determining, by the UE, k PLs corresponding to the one uplink carrier based upon a pre-configured or pre-defined reference carrier, wherein each PL corresponds to one of the k sets of pre-configured power control parameters; and determining the transmit powers of the k uplink channels carrying the uplink information corresponding to the k different eNBs, respectively according to the k sets of pre-configured power control parameters, and the k PLs respectively corresponding to the k sets of pre-configured power control parameters, or for the sixth approach, determining, by the UE, the transmit power of the first uplink channel carrying the uplink information corresponding to the first eNB, and the transmit power of the second uplink channel carrying the uplink information corresponding to the second eNB respectively according to the two sets of pre-configured power control parameters comprises:

determining, by the UE, a PL corresponding to the one uplink carrier based upon a pre-configured or pre-defined reference carrier; and determining the transmit power of the first uplink channel according to a first one of the two sets of pre-configured power control parameters, and the PL, and determining the transmit power of the second uplink channel according to a second one of the two sets of pre-configured power control parameters, and the PL; or determining, by the UE, a first PL and a second PL corresponding to the one uplink carrier respectively based upon a pre-configured or pre-defined reference carrier; and determining the transmit power of the first uplink channel according to a first one of the two sets of pre-configured power control parameters, and the first PL, and determining the transmit power of the second uplink channel according to a second one of the two sets of pre-configured power control parameters, and the second PL;

wherein determining, by the UE, the PL corresponding to the one uplink carrier based upon the pre-configured or pre-defined reference carrier comprises:

obtaining, by the UE, a reference signal received power according to downlink data transmitted over the reference carrier by the first eNB, or the second eNB, or another eNB serving the UE other than the first eNB and the second eNB, and determining the PL corresponding to the one uplink carrier according to the reference signal received power, a pre-configured higher-layer filter parameter, and a reference signal power corresponding to the reference carrier;

or determining, by the UE, the k PLs corresponding to the one uplink carrier based upon the pre-configured or pre-defined reference carrier comprises:

obtaining, by the UE, k reference signal received powers according to downlink data transmitted over the reference carrier respectively by the k different eNBs serving the UE, and determining the k PLs corresponding to the one uplink carrier respectively according to the k reference signal received powers, a pre-configured higher-layer filter parameter, and a reference signal power corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, k pre-configured higher-layer filter parameters, and a reference signal power corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, a pre-configured higher-layer filter parameter, and k reference signal powers corresponding to the reference carrier; or obtaining, by the UE, k reference signal received powers according to downlink data transmitted over the reference carrier respectively by the k different eNBs serving the UE, and determining the k PLs corresponding to the one uplink carrier respectively according to the k reference signal received powers, k pre-configured higher-layer filter parameters, and k reference signal powers corresponding to the reference carrier;

or determining, by the UE, the first PL and the second PL corresponding to the one uplink carrier based upon the pre-configured or pre-defined reference carrier comprises:

obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a pre-configured higher-layer filter parameter, and a reference signal power corresponding to the reference carrier, and determining the second PL according to the second reference signal received power, the pre-configured higher-layer filter parameter, and the reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a first pre-configured higher-layer filter parameter, and a reference signal power corresponding to the reference carrier, and determining the second PL according to the second reference signal received power, a second pre-configured higher-layer filter parameter, and the reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a pre-configured higher-layer filter parameter, and a first reference signal power corresponding to the reference carrier, and determining the second PL according to the second reference signal received power, the pre-configured higher-layer filter parameter, and a second reference signal power corresponding to the reference carrier; or obtaining, by the UE, a first reference signal received power according to downlink data transmitted by the first eNB over the reference carrier, and obtaining a second reference signal received power according to downlink data transmitted by the second eNB over the reference carrier; and determining the first PL according to the first reference signal received power, a first pre-configured higher-layer filter parameter, and a first reference signal power corresponding to the reference carrier, and determining the second PL according to the second reference signal received power, a second pre-configured higher-layer filter parameter, and a second reference signal power corresponding to the reference carrier.

2. The method according to claim 1, wherein the uplink information corresponding to the first eNB comprises at least one of:

first uplink control information corresponding to the first type of carrier, first uplink data scheduled by the first eNB and transmitted over a Physical Uplink Shared Channel (PUSCH), and a Sounding Reference Signal (SRS) corresponding to the first eNB;

wherein the first uplink control information comprises at least one of Acknowledgment (ACK)/Negative Acknowledgement (NACK) feedback information, Channel State Information (CSI) feedback information, and Scheduling Request (SR) information, wherein the CSI feedback information comprises at least one of a Channel Quality Indicator (CQI), a Pre-coding Matrix Indicator (PMI), a Rank Indication (RI), and a Pre-coding Type Indicator (PTI); and the uplink information corresponding to the second eNB comprises at least one of:

second uplink control information corresponding to the second type of carrier, second uplink data scheduled by the second eNB and transmitted over a PUSCH, and an SRS corresponding to the second eNB;

wherein the second uplink control information comprises at least one of ACK/NACK feedback information, CSI feedback information, and SR information, wherein the CSI feedback information comprises at least one of a CQI, a PMI, an RI, and a PTI.

3. The method according to claim 1, wherein the reference carrier is:
a downlink primary carrier of the UE; or a downlink carrier in a pairing relationship with the one uplink carrier; or a downlink carrier pre-configured in higher-layer signaling.

4. The method according to claim 1, wherein for the first approach or the third approach, if a power adjustment value obtained from a Transmit Power Control (TPC) command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the method further comprises:
determining, by the UE, the power adjustment value corresponding to the one uplink channel by accumulating only TPC commands corresponding to the one uplink channel, carried in Physical Downlink Control Channels (PDCCHs) or Enhanced Physical Downlink Control Channels (EPDCCHs) transmitted by the first eNB; or determining, by the UE, the power adjustment value corresponding to the one uplink channel by accumulating only TPC commands corresponding to the one uplink channel, carried in PDCCHs or EPDCCHs transmitted by the second eNB; or determining, by the UE, the power adjustment value corresponding to the one uplink channel by accumulating TPC commands corresponding to the one uplink channel, carried in PDCCHs transmitted by the first eNB and the second eNB; or determining, by the UE, the power adjustment value corresponding to the one uplink channel by accumulating TPC commands corresponding to the one uplink channel, carried in EPDCCHs transmitted by the first eNB and the second eNB;

for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the method further comprises:
determining, by the UE, the power adjustment value corresponding to the one uplink channel by accumulating only TPC commands corresponding to the one uplink channel, carried in PDCCHs or EPDCCHs transmitted by the first eNB; or determining, by the UE, the power adjustment value corresponding to the one uplink channel by accumulating only TPC commands corresponding to the one uplink channel, carried in PDCCHs or EPDCCHs transmitted by the second eNB; or determining, by the UE, the power adjustment value corresponding to the one uplink channel by accumulating only TPC commands corresponding to the one uplink channel, carried in PDCCHs or EPDCCHs transmitted by predefined one of the k different eNBs; or determining, by the UE, the power adjustment value corresponding to the one uplink channel by accumulating TPC commands corresponding to the one uplink channel, carried in PDCCHs transmitted by the first eNB and the second eNB; or determining, by the UE, the power adjustment value corresponding to the one uplink channel by accumulating TPC commands corresponding to the one uplink channel, carried in EPDCCHs transmitted by the first eNB and the second eNB; or determining, by the UE, the power adjustment value corresponding to the one uplink channel by accumulating TPC commands corresponding to the one uplink channel, carried in PDCCHs transmitted by the k different eNBs; or determining, by the UE, the power adjustment value corresponding to the one uplink channel by accumulating TPC commands corresponding to the one uplink channel, carried in EPDCCHs transmitted by the k different eNBs;

for the fourth approach or the sixth approach, if a power adjustment value obtained from a TPC command, corresponding to the first uplink channel is determined in an accumulative manner, and the power adjustment value is used for calculating the transmit power of the first uplink channel, then the method further comprises:
determining, by the UE, the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the method further comprises: determining, by the UE, the power adjustment value corresponding to the second uplink channel by accumulating only TPC commands corresponding to the second uplink channel, carried in PDCCHs or EPDCCHs transmitted by the second eNB; or for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the method further comprises: determining, by the UE, the power adjustment value corresponding to the k-th uplink channel by accumulating only TPC commands corresponding to the k-th uplink channel, carried in PDCCHs or EPDCCHs transmitted by the k-th eNB.

5. The method according to claim 1, wherein for the fourth approach or the sixth approach, if the UE transmits the first uplink channel carrying the uplink information corresponding to the first eNB, and the second uplink channel carrying the uplink information corresponding to the second eNB, in the same uplink subframe of the one uplink carrier, and total transmit power in the uplink subframe exceeds maximum transmit power of the one uplink carrier, or maximum transmit power of the UE, then the method further comprises:
scaling, by the UE, the power of the first uplink channel and the second uplink channel at the same proportion so that the current total transmit power in the uplink subframe does not exceed either the maximum transmit power of the one uplink carrier, or the maximum transmit power of the UE; or scaling, by the UE, the power of the first uplink channel and/or the second uplink channel according to pre-defined priorities so that the current total transmit power in the uplink subframe does not exceed either the maximum transmit power of the one uplink carrier, or the maximum transmit power of the UE; or for the fifth approach, if the UE transmits the k uplink channels carrying the uplink information corresponding to the k different eNBs in the same uplink subframe of the one uplink carrier, and total transmit power in the uplink subframe exceeds maximum transmit power of the one uplink carrier, or maximum transmit power of the UE, then the method further comprises:

scaling, by the UE, the power of the k uplink channels at the same proportion so that the current total transmit power in the uplink subframe does not exceed either the maximum transmit power of the one uplink carrier, or the maximum transmit power of the UE; or scaling, by the UE, the power of several uplink channels of the k uplink channels according to pre-defined priorities so that the current total transmit power in the uplink subframe does not exceed either the maximum transmit power of the one uplink carrier, or the maximum transmit power of the UE.

6. The method according to claim 1, wherein:
the first eNB is a Master evolved NodeB (MeNB), and the second eNB is a Secondary evolved NodeB (SeNB); or
the first eNB is an SeNB, and the second eNB is an MeNB; or
the first eNB is an eNB of a macro cell, and the second eNB is an eNB of a small cell; or
the first eNB is an eNB of a small cell, and the second eNB is an eNB of a macro cell; or
the first eNB is an eNB serving a Primary Component Carrier (PCC) of the UE, and the second eNB is an eNB serving at least one Secondary Component Carrier (SCC) of the UE.

7. The method according to claim 1, wherein the one uplink carrier is:
only one uplink carrier over which uplink data are transmitted, configured by the network side for the UE; or
pre-defined or pre-configured one of a plurality of uplink carriers over which uplink data are transmitted, configured by the network side for the UE; or an uplink primary carrier of the UE.

8. A UE, comprising:
a first processing module configured to determine uplink information to be transmitted over one uplink carrier, wherein the uplink information comprises uplink information corresponding to a first eNB, and uplink information corresponding to a second eNB; and the first eNB is configured to at least schedule data to the UE over a first type of carrier, and the second eNB is configured to at least schedule data to the UE over a second type of carrier; and
a second processing module configured to determine transmit power of at least one uplink channel carrying the uplink information, according to at least one set of pre-configured power control parameters for calculating transmit power of an uplink channel carrying the uplink information, and to transmit the corresponding uplink information in the at least one uplink channel over the one uplink carrier at the transmit power of the at least one uplink channel;
wherein the second processing module performs one of the following approaches:
as a first approach, the second processing module determines transmit power of one uplink channel carrying the uplink information corresponding to the first eNB, and the uplink information corresponding to the second eNB concurrently, according to one set of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with only one set of power control parameters for calculating transmit power of that type of uplink channel; or as a second approach, the second processing module determines transmit power of one uplink channel carrying uplink information corresponding to k different eNBs concurrently, according to k sets of pre-configured power control parameters for calculating transmit power of an uplink channel carrying the uplink information, and transmits the uplink information corresponding to eNBs for which the uplink information needs to be transmitted in the current uplink subframe, among the k different eNBs in the one uplink channel over the one uplink carrier at the transmit power of the one uplink channel, wherein for each type of uplink channel carrying the uplink information, the UE is configured with k sets of power control parameters for calculating transmit power of that type of uplink channel, wherein k represents the number of eNBs serving the UE; or as a third approach, the second processing module determines transmit power of one uplink channel carrying the uplink information corresponding to the first eNB, and the uplink information corresponding to the second eNB concurrently, according to two sets of pre-configured power control parameters for calculating transmit power of an uplink channel carrying the uplink information, and transmits the uplink information corresponding to the first eNB, and the uplink information corresponding to the second eNB in the one uplink channel over the one uplink carrier at the transmit power of the one uplink channel, wherein for each type of uplink channel carrying the uplink information, the UE is configured with two sets of power control parameters for calculating transmit power of that type of uplink channel; or as a fourth approach, the second processing module determines transmit power of a first uplink channel carrying the uplink information corresponding to the first eNB, and transmit power of a second uplink channel carrying the uplink information corresponding to the second eNB, respectively according to one set of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with only one set of power control parameters for calculating transmit power of that type of uplink channel; or as a fifth approach, the second processing module determines transmit powers of k uplink channels carrying uplink information corresponding to k different eNBs, respectively according to k sets of pre-configured power control parameters for calculating transmit power of an uplink channel carrying the uplink information, and transmits the uplink information corresponding to the k-th eNB in the k-th uplink channel over the one uplink carrier at the transmit power of the k-th uplink channel, wherein for each type of uplink channel carrying the uplink information, the UE is configured with k sets of power control parameters for calculating transmit power of that type of uplink channel, wherein k represents the number of eNBs serving the UE; or as a sixth approach, the second processing module determines transmit power of a first uplink channel carrying the uplink information corresponding to the first eNB, and transmit power of a second uplink channel carrying the uplink information corresponding to the second eNB respectively according to two sets of pre-configured power control parameters for calculating transmit power of an uplink channel carrying the uplink information, and transmits the uplink information corresponding to the first eNB in the first uplink channel over the one uplink carrier at the transmit power of the first uplink channel, and the uplink information corresponding to the second eNB in the second uplink channel over the one uplink carrier at the transmit power of the second uplink channel, wherein for each type of uplink channel carrying the uplink information, the UE is configured with two sets of power control parameters for calculating transmit power of that type of uplink channel;

wherein for the first approach, the second processing module is configured:

to determine a Path Loss (PL) corresponding to the one uplink carrier based upon a pre-configured or pre-defined reference carrier, and to determine the transmit power of the one uplink channel according to the one set of pre-configured power control parameters, and the PL, or for the second approach, the second processing module is configured:

to determine a PL corresponding to the one uplink carrier based upon a pre-configured or pre-defined reference carrier; to determine k target transmit powers respectively according to the k sets of pre-configured power control parameters, and the PL; and to take the largest one or the average of the k target transmit powers as the transmit power of the one uplink channel; or to determine k PLs corresponding to the one uplink carrier respectively based upon a pre-configured or pre-defined reference carrier, wherein each PL corresponds to one of the k sets of pre-configured power control parameters; to determine k target transmit powers respectively according to the k sets of pre-configured power control parameters, and the k PLs respectively corresponding to the k sets of pre-configured power control parameters; and to take the largest one or the average of the k target transmit powers as the transmit power of the one uplink channel, or for the third approach, the second processing module is configured:

to determine a PL corresponding to the one uplink carrier based upon a pre-configured or pre-defined reference carrier; to determine first target transmit power according to a first one of the two sets of pre-configured power control parameters, and the PL, and to determine second target transmit power according to a second one of the two sets of pre-configured power control parameters, and the PL; and to take the larger one or the average of the determined two target transmit powers as the transmit power of the one uplink channel; or to determine a first PL and a second PL corresponding to the one uplink carrier respectively based upon a pre-configured or pre-defined reference carrier, wherein the first PL corresponds to a first one of the two sets of pre-configured power control parameters, and the second PL corresponds to a second one of the two sets of pre-configured power control parameters; to determine first target transmit power according to the first one of the two sets of pre-configured power control parameters, and the first PL, and to determine second target transmit power according to the second one of the two sets of pre-configured power control parameters, and the second PL; and to take the larger one or the average of the determined two target transmit powers as the transmit power of the one uplink channel, or for the fourth approach, the second processing module is configured:

to determine a PL corresponding to the one uplink carrier based upon a pre-configured or pre-defined reference carrier; to determine target transmit power according to the one set of pre-configured power control parameters, and the PL; and to take the determined target transmit power as the transmit power of the first uplink channel, and the transmit power of the second uplink channel; or to determine a first PL and a second PL corresponding to the one uplink carrier respectively based upon the pre-configured or pre-defined reference carrier; and to determine the transmit power of the first uplink channel according to the one set of pre-configured power control parameters, and the first PL corresponding to the one uplink carrier, and to determine the transmit power of the second uplink channel according to the one set of pre-configured power control parameters, and the second PL corresponding to the one uplink carrier, or for the fifth approach, the second processing module is configured:

to determine a PL corresponding to the one uplink carrier based upon a pre-configured or pre-defined reference carrier, and to determine the transmit powers of the k uplink channels carrying the uplink information corresponding to the k different eNBs, respectively according to the k sets of pre-configured power control parameters, and the PL; or to determine k PLs corresponding to the one uplink carrier based upon a pre-configured or pre-defined reference carrier, wherein each PL corresponds to one of the k sets of pre-configured power control parameters; and to determine the transmit powers of the k uplink channels carrying the uplink information corresponding to the k different eNBs, respectively according to the k sets of pre-configured power control parameters, and the k PLs respectively corresponding to the k sets of pre-configured power control parameters, or for the sixth approach, the second processing module is configured:

to determine a PL corresponding to the one uplink carrier based upon a pre-configured or pre-defined reference carrier; and to determine the transmit power of the first uplink channel according to a first one of the two sets of pre-configured power control parameters, and the PL, and to determine the transmit power of the second uplink channel according to a second one of the two sets of pre-configured power control parameters, and the PL; or to determine a first PL and a second PL corresponding to the one uplink carrier respectively based upon a pre-configured or pre-defined reference carrier; and to determine the transmit power of the first uplink channel according to a first one of the two sets of pre-configured power control parameters, and the first PL, and to determine the transmit power of the second uplink channel according to a second one of the two sets of pre-configured power control parameters, and the second PL;

wherein the second processing module configured to determine the PL corresponding to the one uplink carrier based upon the pre-configured or pre-defined reference carrier is configured:

to obtain a reference signal received power according to downlink data transmitted by the first eNB, or the second eNB, or another eNB serving the UE other than the first eNB and the second eNB over the reference carrier, and to determine the PL corresponding to the one uplink carrier according to the reference signal received power, a pre-configured higher-layer filter parameter, and a reference signal power corresponding to the reference carrier;

or the second processing module configured to determine the k PLs corresponding to the one uplink carrier based upon the pre-configured or pre-defined reference carrier is configured:

to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and a reference signal power corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, a pre-configured higher-layer filter parameter, and k reference signal powers corresponding to the reference carrier; or to obtain k reference signal received powers according to downlink data transmitted over the reference carrier respectively by the k different eNBs serving the UE, and to determine the k PLs corresponding to the one uplink carrier respectively according to the k reference signal received powers, k pre-configured higher-layer filter parameters, and k reference signal powers corresponding to the reference carrier;

or the second processing module configured to determine the first PL and the second PL corresponding to the one uplink carrier based upon the pre-configured or pre-defined reference carrier is configured:

to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a reference signal power corresponding to the reference carrier, and to determine the second PL according to the second reference signal received power, the pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a reference signal power corresponding to the reference carrier, and to determine the second PL according to the second reference signal received power, a second pre-configured higher-layer filter parameter, and the reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a pre-configured higher-layer filter parameter, and a first reference signal power corresponding to the reference carrier, and to determine the second PL according to the second reference signal received power, the pre-configured higher-layer filter parameter, and a second reference signal power corresponding to the reference carrier; or to obtain a first reference signal received power according to downlink data transmitted by the first eNB over the reference carrier, and to obtain a second reference signal received power according to downlink data transmitted by the second eNB over the reference carrier; and to determine the first PL according to the first reference signal received power, a first pre-configured higher-layer filter parameter, and a first reference signal power corresponding to the reference carrier and to determine the second PL according to the second reference signal received power, a second pre-configured higher-layer filter parameter, and a second reference signal power corresponding to the reference carrier.

9. The UE according to claim 8, wherein:

for the first approach or the third approach, if a power adjustment value obtained from a TPC command, corresponding to the one uplink channel carrying the uplink information corresponding to the first eNB, and the uplink information corresponding to the second eNB concurrently is determined in an accumulative manner, and the power adjustment value is used for calculating the transmit power of the one uplink channel, then the second processing module is further configured: to determine the power adjustment value corresponding to the one uplink channel by accumulating only Transmit Power Control (TPC) commands corresponding to the one uplink channel, carried in Physical Downlink Control Channels (PDCCHs) or Enhanced Physical Downlink Control Channels (EPDCCHs) transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB;

for the second approach, if a power adjustment value obtained from a TPC command, corresponding to the one uplink channel carrying the uplink information corresponding to the k different eNBs concurrently is determined in an accumulative manner, and the power adjustment value is used for calculating the transmit power of the one uplink channel, then the second processing module is further configured: to determine the power adjustment value corresponding to the one uplink channel by accumulating only TPC commands corresponding to the one uplink channel, carried in PDCCHs or EPDCCHs transmitted by the first eNB; or to determine the power adjustment value corresponding to the one uplink channel by accumulating only TPC commands corresponding to the one uplink channel, carried in PDCCHs or EPDCCHs transmitted by the second eNB; or to determine the power adjustment value corresponding to the one uplink channel by accumulating only TPC commands corresponding to the one uplink channel, carried in PDCCHs or EPDCCHs transmitted by predefined one of the k different eNBs; or to determine the power adjustment value corresponding to the one uplink channel by accumulating TPC commands corresponding to the one uplink channel, carried in PDCCHs transmitted by the first eNB and the second eNB; or to determine the power adjustment value corresponding to the one uplink channel by accumulating TPC commands corresponding to the one uplink channel, carried in EPDCCHs transmitted by the first eNB and the second eNB; or to determine the power adjustment value corresponding to the one uplink channel by accumulating TPC commands corresponding to the one uplink channel, carried in PDCCHs transmitted by the k different eNBs; or to determine the power adjustment value corresponding to the one uplink channel by accumulating TPC commands corresponding to the one uplink channel, carried in EPDCCHs transmitted by the k different eNBs;

for the fourth approach or the sixth approach, if a power adjustment value obtained from a TPC command, corresponding to the first uplink channel is determined in an accumulative manner, and the power adjustment value is used for calculating the transmit power of the first uplink channel, then the second processing module is further configured to determine the power adjustment value corresponding to the first uplink channel by accumulating only TPC commands corresponding to the first uplink channel, carried in PDCCHs or EPDCCHs transmitted by the first eNB; and if the power adjustment value corresponding to the second uplink channel is determined in an accumulative manner, and the power adjustment value is used for calculating the transmit power of the second uplink channel, then the second processing module is further configured to determine the power adjustment value corresponding to the second uplink channel by accumulating only TPC commands corresponding to the second uplink channel, carried in PDCCHs or EPDCCHs transmitted by the second eNB; and for the fifth approach, if a power adjustment value obtained from a TPC command, corresponding to the k-th one of the k uplink channels carrying the uplink information corresponding to the k different eNBs respectively is determined in an accumulative manner, and the power adjustment value is used for calculating the transmit power of the k-th uplink channel, then the second processing module is further configured to determine the power adjustment value corresponding to the k-th uplink channel by accumulating only TPC commands corresponding to the k-th uplink channel, carried in PDCCHs or EPDCCHs transmitted by the k-th eNB.

10. The UE according to claim 8, wherein for the fourth approach or the sixth approach, if the first uplink control information and the second uplink control information is transmitted in the same uplink subframe of the one uplink carrier, and total transmit power in the uplink subframe exceeds maximum transmit power of the one uplink carrier, or maximum transmit power of the UE, then preferably the second processing module is further configured:

to scale the power of the first uplink channel and the second uplink channel at the same proportion so that the current total transmit power in the uplink subframe does not exceed either the maximum transmit power of the one uplink carrier, or the maximum transmit power of the UE; or to scale the power of the first uplink channel and/or the second uplink channel according to pre-defined priorities so that the current total transmit power in the uplink subframe does not exceed either the maximum transmit power of the one uplink carrier, or the maximum transmit power of the UE;

or for the fifth approach, if the k uplink channels carrying the uplink information corresponding to the k different eNBs is transmitted in the same uplink subframe of the one uplink carrier, and total transmit power in the uplink subframe exceeds maximum transmit power of the one uplink carrier, or maximum transmit power of the UE, then the second processing module is further configured:

to scale the power of the k uplink channels at the same proportion so that the current total transmit power in the uplink subframe does not exceed either the maximum transmit power of the one uplink carrier, or the maximum transmit power of the UE; or to scale the power of several uplink channels of the k uplink channels according to pre-defined priorities so that the current total transmit power in the uplink subframe does not exceed either the maximum transmit power of the one uplink carrier, or the maximum transmit power of the UE.

* * * * *